US012749822B2

(12) United States Patent
Hung et al.

(10) Patent No.: US 12,749,822 B2
(45) Date of Patent: Sep. 29, 2026

(54) BEAMFORMING ANTENNA DEVICE AND METHOD FOR OPERATING A BEAMFORMING ANTENNA DEVICE

(71) Applicant: TRON FUTURE TECH INC., Hsinchu City (TW)

(72) Inventors: Kun-Chien Hung, Hsinchu City (TW); Yu-Jiu Wang, Hsinchu City (TW); Bor-Ching Su, Hsinchu City (TW); Chien Cheng Wang, Hsinchu City (TW); Chien-Te Li, Hsinchu City (TW)

(73) Assignee: TRON FUTURE TECH INC., Hsinchu City (TW)

( * ) Notice: Subject to any disclaimer, the term of this patent is extended or adjusted under 35 U.S.C. 154(b) by 353 days.

(21) Appl. No.: 18/516,989

(22) Filed: Nov. 22, 2023

(65) Prior Publication Data

US 2024/0178558 A1 May 30, 2024

Related U.S. Application Data

(60) Provisional application No. 63/385,153, filed on Nov. 28, 2022.

(51) Int. Cl.
*H01Q 21/00* (2006.01)
*H01Q 3/26* (2006.01)

(52) U.S. Cl.
CPC ......... *H01Q 21/0025* (2013.01); *H01Q 3/267* (2013.01)

(58) Field of Classification Search
CPC ........................... H01Q 21/0025; H01Q 3/267
See application file for complete search history.

(56) References Cited

U.S. PATENT DOCUMENTS

2008/0036648 A1* 2/2008 Green .................... H01Q 21/06 342/174
2016/0329631 A1* 11/2016 Rheinfelder ....... H01Q 21/0025
2024/0310476 A1* 9/2024 Welle ................. H01Q 21/0025

FOREIGN PATENT DOCUMENTS

CN 106526571 A * 3/2017 ........... G01S 7/4815
WO WO-2011119028 A1 * 9/2011 ......... H01Q 21/0025

OTHER PUBLICATIONS

H.J. De Los Santos, Introduction to Microelectromechanical (MEM) Microwave Systems, Arctech House, p. 159-195 (Year: 1999).*
Office action issued by TIPO dated Apr. 14, 2025 for TW112145220.
English translation of the Office Action issued by TIPO dated Apr. 14, 2025 for TW112145220.
English translation of the Search report appended to the Office Action issued by TIPO dated Apr. 14, 2025 for TW112145220.
English translation of abstract of CN106526571.

* cited by examiner

*Primary Examiner* — Vladimir Magloire
*Assistant Examiner* — Fred H Mull
(74) *Attorney, Agent, or Firm* — WPAT, P.C.; Anthony King

(57) ABSTRACT

The present application discloses a beamforming antenna device and a method for operating a beamforming antenna device. The beamforming antenna device includes a plurality of antenna elements and a plurality of sub-arrays. The plurality of sub-arrays are coupled to the plurality of antenna elements. Each of the sub-arrays is coupled to its adjacent sub-arrays of the plurality of sub-arrays, and at least a portion of the plurality of sub-arrays form a sub-array chain.

18 Claims, 16 Drawing Sheets

BEAMFORMING ANTENNA DEVICE AND METHOD FOR OPERATING A BEAMFORMING ANTENNA DEVICE

CROSS REFERENCE

This application claims the benefit of prior-filed U.S. provisional application No. 63/385,153, filed on Nov. 28, 2022, which is incorporated by reference in its entirety.

TECHNICAL FIELD

The present disclosure relates to a beamforming antenna device, and more particularly, to a beamforming antenna device having a distributed sub-array network.

DISCUSSION OF THE BACKGROUND

In modern wireless communication technologies, satellite communications has become competitive for it provides better signal coverage and higher bandwidth as compared to conventional terrestrial communication technologies. To achieve the satellite communications, phased-array antennas that can achieve beamforming is demanded. Generally, the beamforming may be achieved by properly adjusting the relative phases and gains transmitted and/or received by each element of the phased array antenna. However, it can be challenging to design a hardware system for processing all the signals transmitted and received by the phased-array robustly and flexibly.

This Discussion of the Background section is provided for background information only. The statements in this Discussion of the Background are not an admission that the subject matter disclosed in this section constitutes prior art to the present disclosure, and no part of this Discussion of the Background section may be used as an admission that any part of this application, including this Discussion of the Background section, constitutes prior art to the present disclosure.

SUMMARY

One aspect of the present disclosure provides a beamforming antenna device. The beamforming antenna device includes a plurality of antenna elements, and a plurality of sub-arrays. The sub-arrays are coupled to the plurality of antenna elements, wherein each of the sub-arrays is coupled to its adjacent sub-arrays of the plurality of sub-arrays, and at least a portion of the plurality of sub-arrays form a sub-array chain.

Another aspect of the present disclosure provides a method for operating a beamforming antenna device. The beamforming antenna device includes a plurality of antenna elements and a plurality of sub-arrays coupled to the antenna elements. The method includes propagating a clock signal originated from a master sub-array of the plurality of sub-array sequentially through the rest of the plurality of sub-arrays in a manner of node-to-node transmission, receiving a plurality of antenna signals by the plurality of antenna elements, deriving in-phase signals by utilizing at least a portion of the plurality of sub-arrays in a sub-array chain to perform phase align operations according to antenna signals received by antenna elements that are coupled to the sub-arrays in the sub-array chain, and aggregating the in-phase signals along the sub-array chain to generate a beamformed signal.

Since the beamforming antenna device provided by the embodiments of the present disclosure has a distributed structure, it allows the user to flexibly configure the data path for in-phase signal aggregation. For example, a sub-array chain structure can be implemented by configuring the sub-arrays in the beamforming antenna devices. In such case, each sub-arrays only requires a small number of input/output ports (i.e., low fan-in/fan-out). Furthermore, the structure of chain node also provides great extensibility. That is, when the size of the phased-array increases, the chain node can extend its support by simply cascading more sub-arrays to the chain. In addition, with the flexible structure of the sub-array network, a bypass path can be provided when a sub-array in the sub-array chain is failed, thereby improving the reliability of the beamforming antenna device.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures.

DETAILED DESCRIPTION

The following description of the disclosure accompanies drawings, which are incorporated in and constitute a part of this specification, and which illustrate embodiments of the disclosure, but the disclosure is not limited to the embodiments. In addition, the following embodiments can be properly integrated to complete another embodiment.

References to "one embodiment," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

In order to make the present disclosure completely comprehensible, detailed steps and structures are provided in the following description. Obviously, implementation of the present disclosure does not limit special details known by persons skilled in the art. In addition, known structures and steps are not described in detail, so as not to unnecessarily limit the present disclosure. Preferred embodiments of the present disclosure will be described below in detail. However, in addition to the detailed description, the present disclosure may also be widely implemented in other embodiments. The scope of the present disclosure is not limited to the detailed description, and is defined by the claims.

Figure 1:
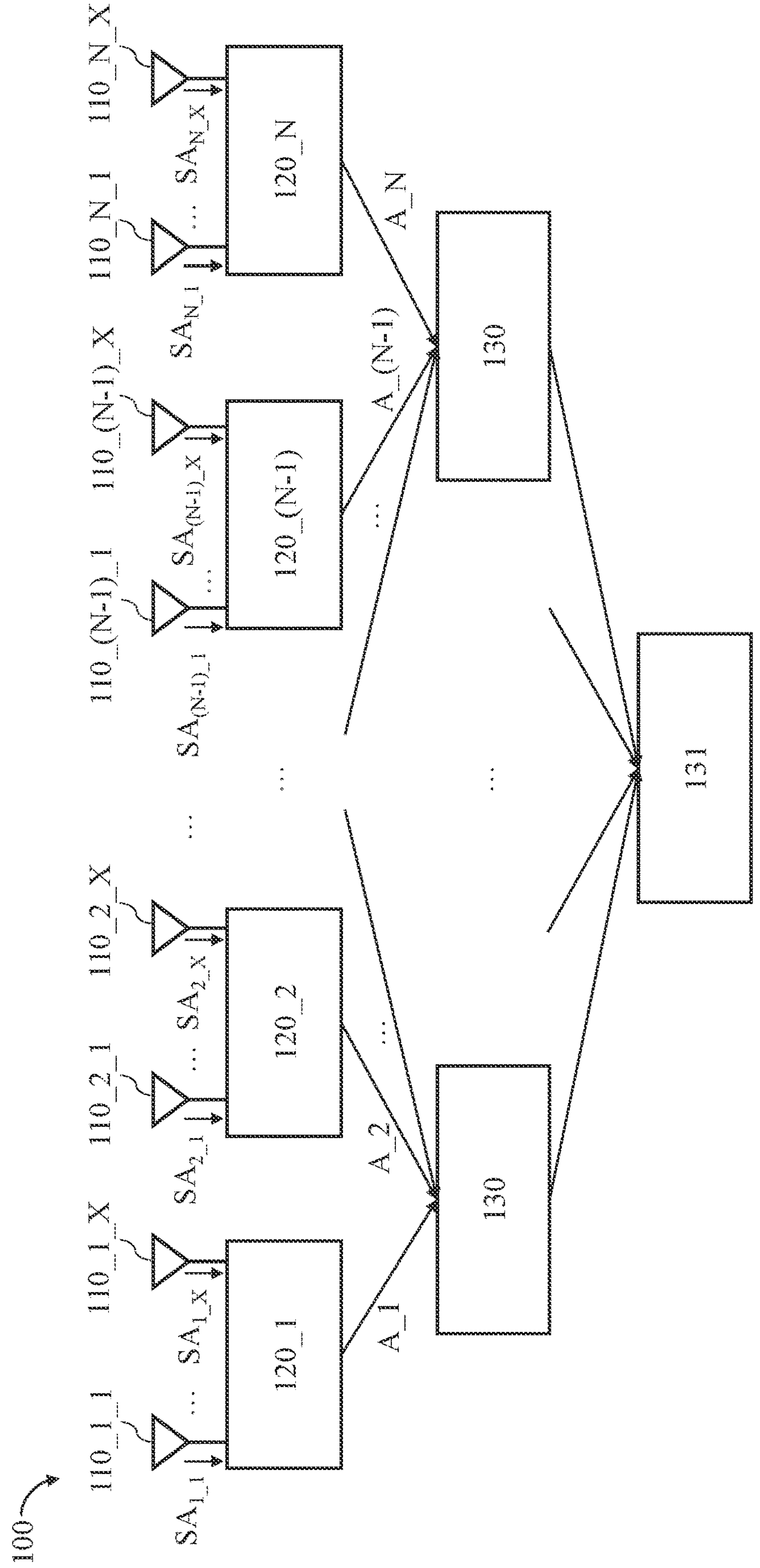
FIG. 1 shows a beamforming antenna device according to one comparative embodiment.

FIG. 1 shows a beamforming antenna device 100 according to one comparative embodiment. The beamforming antenna device 100 includes a plurality of antenna elements 110_1_1 to 110_N_X, a plurality of phase-align arrays 120_1 to 120_N, and a plurality of sub-arrays 130, where N and X are integers greater than 1. The antenna elements 110_1_1 to 110_N_X can be arranged as a phased-array. As shown in FIG. 1, each of the phase-align arrays 120_1 to 120_N is coupled to X antenna elements. For example, the phase-align array 120_1 may be coupled to antenna elements 110_1_1 to 110_1_X, and the phase-align array 120_2 may be coupled to antenna elements 110_2_1 to 110_2_X, and so on. In addition, each of the sub-arrays 130 is coupled to a plurality of phase-align arrays or a plurality of other sub-arrays 130. In such case, the phase-align arrays 120_1 to 120_N and the sub-arrays 130 are arranged in a tree structure.

In a receiving mode, the antenna elements 110_1_1 to 110_N_X may receive antenna signals $SA_{1\_1}$ to $SA_{N\_X}$. Since the signals $SA_{1\_1}$ to $SA_{N\_X}$ may have different delays (i.e., corresponding to different phases), the beamforming antenna device 100 needs to align the phases of the received signals $SA_{1\_1}$ to $SA_{N\_X}$ and aggregate the in-phase signals so as to generate the beamformed signal.

In such case, the antenna signals $SA_{1\_1}$ to $SA_{N\_X}$ can be transmitted to the corresponding phase-align arrays 120_1 to 120_N for frontend processing and analog-to-digital conversion. For example, the phase-align array 120_1 may receive the signals $SA_{1\_1}$ to $SA_{1\_X}$ received by the antenna elements 110_1 to 110_X, the phase-align array 120_2 may receive the signals $SA_{2\_1}$ to $SA_{2\_X}$ received by the antenna elements 110_2_1 to 110_2_X, and so on. After the analog-to-digital conversion, the phase-align arrays 120_1 to 120_N can perform phase align operations to the digital signals so as to generate the in-phase signals of the antenna signals.

Afterwards, the phase-align arrays 120_1 to 120_N can further aggregate the in-phase signals to generate partial aggregation result A_1 to A_N respectively, and the sub-arrays 130 can further aggregate the partial aggregation results received from the corresponding phase-align arrays. Finally, the root sub-array 131 can aggregate all the partial aggregation results so that the beamformed signal can be derived accordingly.

According to the tree structure of the beamforming antenna device 100 shown in FIG. 1, to reduce the depth of the tree, each of the sub-arrays 130 may be coupled to a large number of phase-align arrays or sub-arrays, which means that each of the sub-arrays 130 may have a large number of input ports or nodes (i.e., high fan-in). However, in some cases, the sub-array 130 may be implemented by a field programmable gate array (FPGA), which has only limited SERDES (serializer/deserializer) ports. In such case, the structure of the beamforming antenna device 100 may be limited by the number of SERDES ports in each FPGA. Furthermore, the tree structure makes the beamforming antenna device 100 vulnerable to single node or sub-array failure. For example, if the root merge sub-array 131 is failed, the beamforming antenna device 100 may also fail.

To tackle the issues caused by the tree structure, one embodiment of the present disclosure provides a multi-dimension sub-array network, which allows to align the signal phases and aggregate the in-phase signals in a chain structure.

Figure 2:
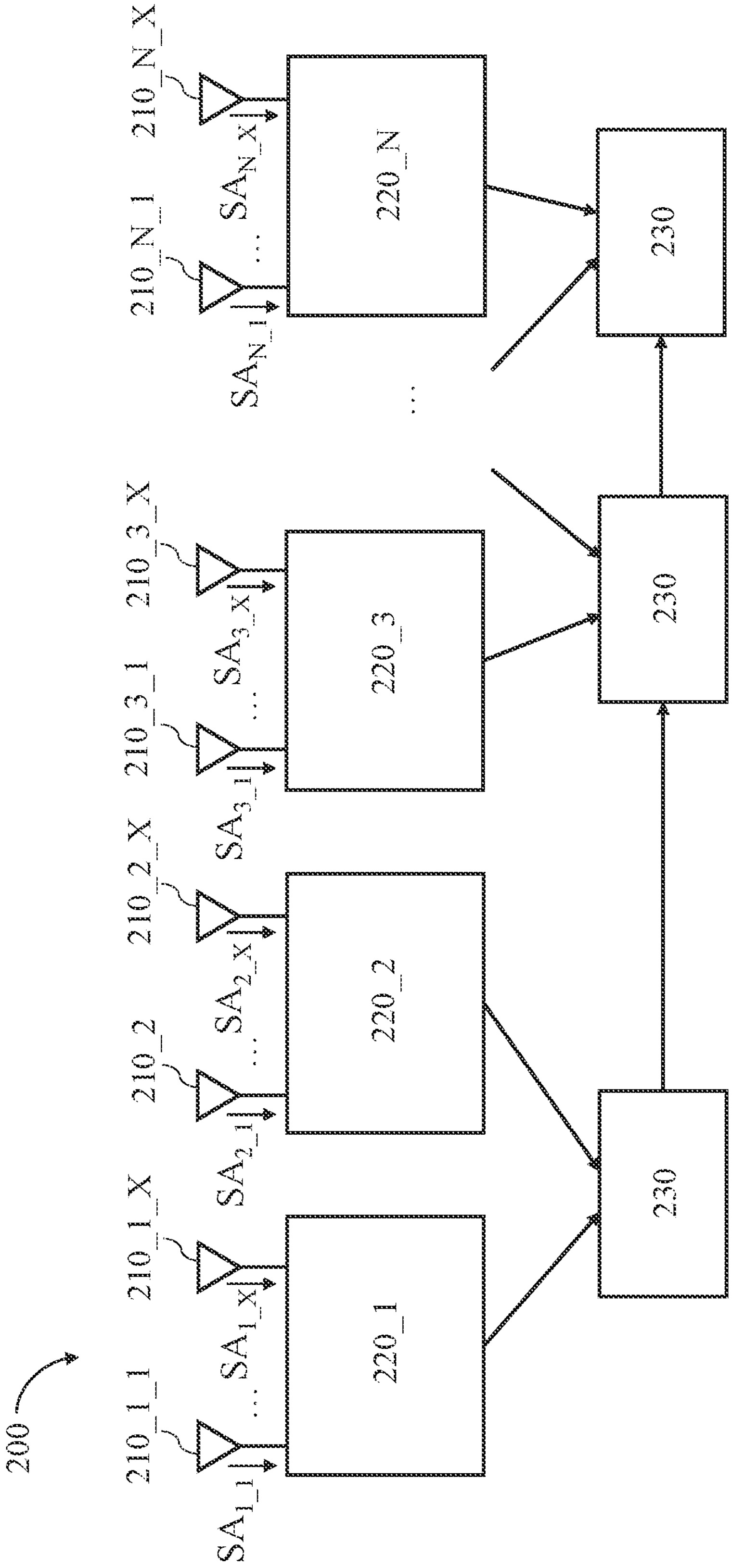
FIG. 2 shows a beamforming antenna device according to one embodiment of the present disclosure.

FIG. 2 shows a beamforming antenna device 200 according to one embodiment of the present disclosure. The beamforming antenna device 200 includes a plurality of antenna elements 210_1_1 to 210_N_X, a plurality of phase-align arrays 220_1 to 220_N, and a plurality of sub-arrays 230, where N and X are integers greater than 1. The antenna elements 210_1_1 to 210_N_X can be arranged as a phased-array. As shown in FIG. 2, each of the phase-align arrays 220_1 to 220_N is coupled to X antenna elements. For example, the phase-align array 220_1 may be coupled to antenna elements 210_1_1 to 210_1_X, and the phase-align array 220_2 may be coupled to antenna elements 210_2_1 to 210_2_X, and so on. In addition, each of the sub-arrays 230 is coupled to a plurality of phase-align arrays or a plurality of other sub-arrays 230. In this embodiment, the phase-align arrays 220_1 to 220_N and the sub-arrays 230 are arranged in a hybrid structure of tree structure and chain structure. More specifically, the data or signal transmitted between the phase-align arrays 220_1 to 220_N and the sub-arrays 230 are in tree style while the data or signal transmitted along the sub-arrays 230 are in chain style.

Figure 3:
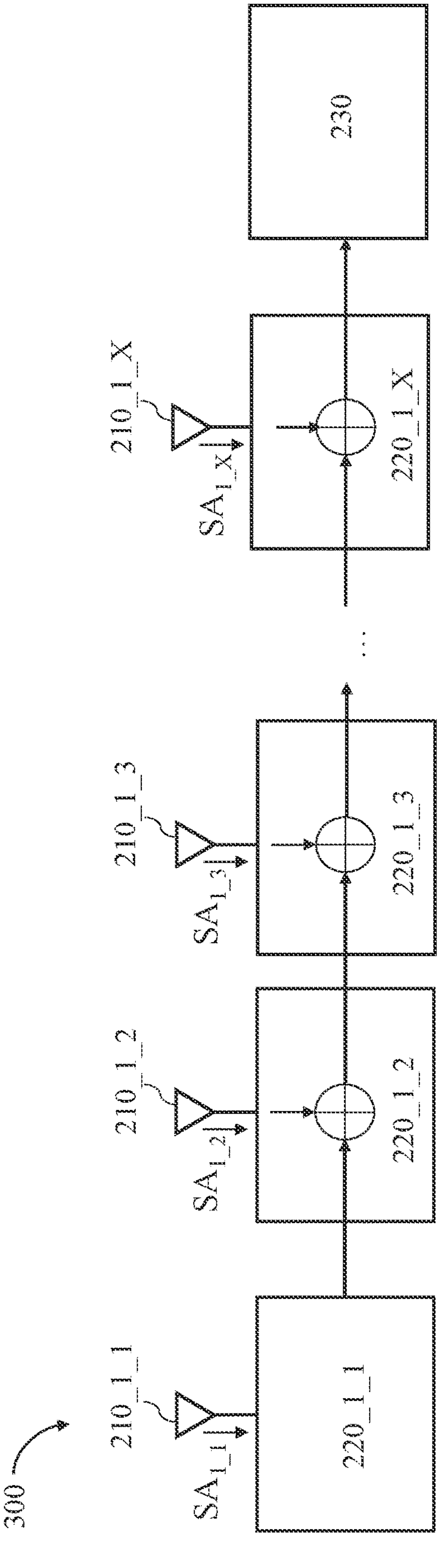
FIG. 3 shows a portion of a beamforming antenna device according to one embodiment of the present disclosure.

FIG. 3 shows a portion of the beamforming antenna device 300 according to one embodiment of the present disclosure. In FIG. 3, the antenna elements 210_1_1 to 210_1_X and the phase-align arrays 220_1 to 220_1_X are shown to explain the arrangement among the antenna elements, the phase-align arrays, and the sub-arrays. In this embodiment the phase-align arrays 220_1 to 220_1_X and the sub-array 230 form a chain-structure array. In such case, each of the phase-align arrays 220_1_1 to 220_1_X can be coupled to a corresponding one of the antenna elements 210_1_1 to 210_1_X. Furthermore, each of the phase-align arrays 220_1_1 to 220_1_X can perform the phase aligned operation for the received signals $SA_{1\_1}$ to $SA_{1\_X}$, and can transmit the operated result to a next phase-align array. For example, the phase-align array 220_1_1 may transmit the aligned result (i.e., the in-phase result) of the signals $SA_{1\_1}$ to the phase-align array 220_1_2, and the phase-align array 220_1_2 may aggregate the aligned results (i.e., the in-phase results) of the signals $SA_{1\_1}$ and $SA_{1\_2}$ and output the aggregated result to the next phase-align array 220_1_3, and so on. Finally, the sub-array 230 can collect the aligned signals aggregated along the chain structure and output the aggregate result.

Figure 4:
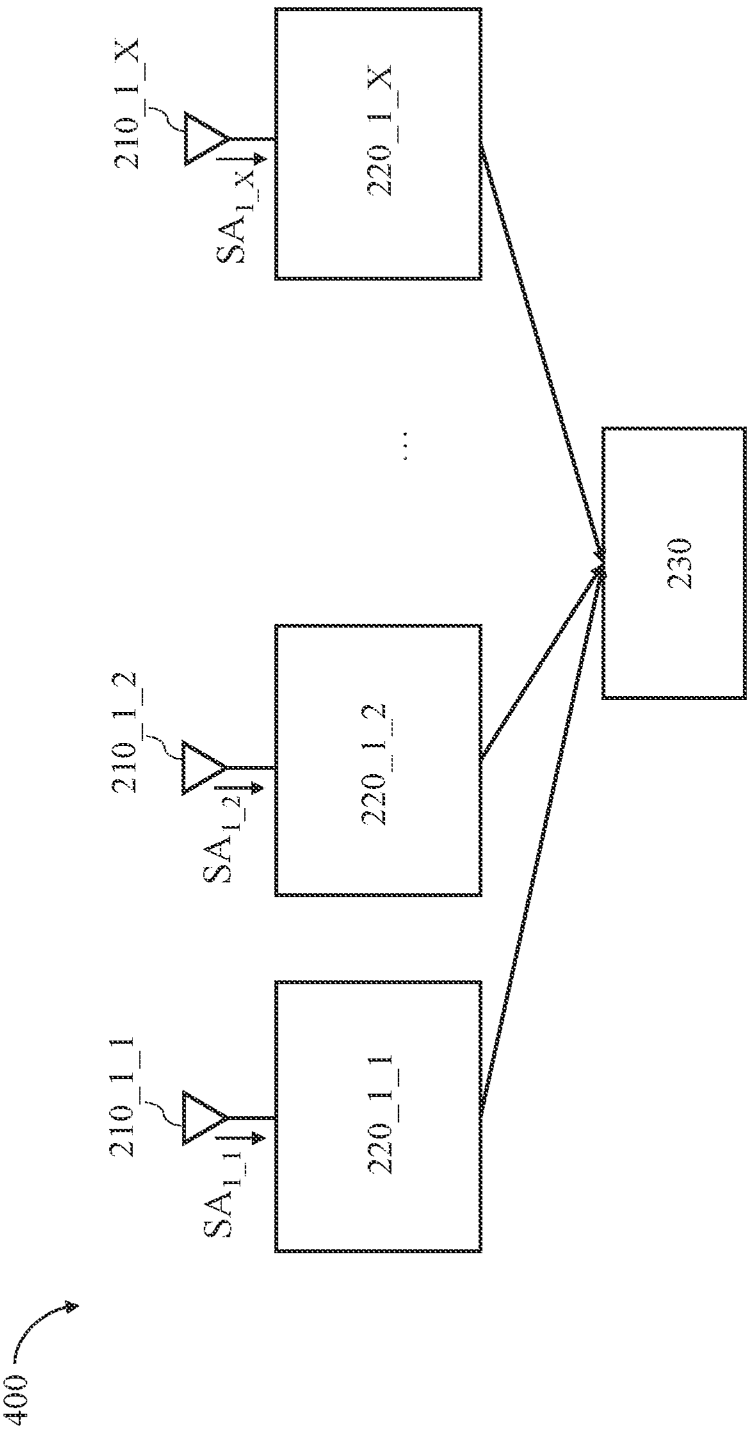
FIG. 4 shows a portion of a beamforming antenna device according to one embodiment of the present disclosure.

FIG. 4 shows a portion of the beamforming antenna device 400 according to one embodiment of the present disclosure. In FIG. 4, the antenna elements 210_1_1 to 210_1_X, the phase-align arrays 220_1_1 to 220_1_X, and the sub-array 230 are shown to explain the arrangement among the antenna elements, the phase-align arrays, and the sub-arrays. In this embodiment the phase-align arrays 220_1_1 to 220_1_X, and the sub-array 230 form a tree-structure. In such case, each of the phase-align arrays 220_1_1 to 220_1_X can be coupled to a corresponding one of the antenna elements 210_1_1 to 210_1_X. Furthermore, each of the phase-align arrays 220_1_1 to 220_1_X can perform the phase aligned operation for the received signals $SA_{1\_1}$ to $SA_{1\_X}$, and the operated results (i.e., the in-phase results) of the signals $SA_{1\_1}$ to $SA_{1\_X}$ can be transmitted to the sub-array 230 for aggregation.

It is noted that the beamforming antenna device is not limited to the embodiments as shown in FIG. 3 and FIG. 4. The phase-align arrays 220_1_1 to 220_1_X may be modified to become the hybrid form of phase-align array, i.e. a mixed structure of chain-structure and tree-structure. For example, the phase-align arrays 220_1_1 to 220_1_X may be arranged to have two layers, where the first layer is tree structure and the second layer is chain structure. The mixed structure is similar to the hybrid structure as shown in FIG. 2, thus the detailed description is omitted here for brevity.

Figure 5:
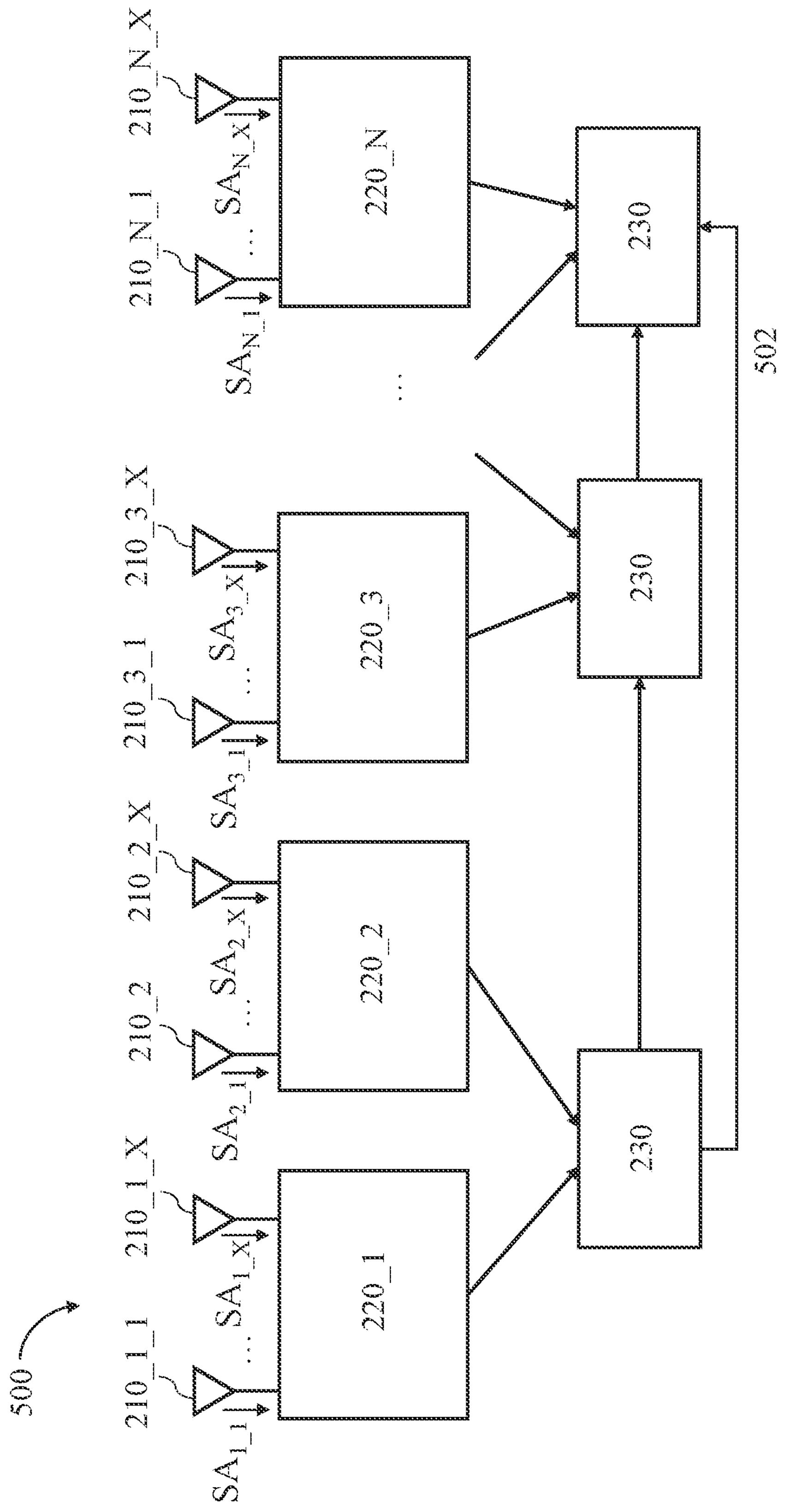
FIG. 5 shows a beamforming antenna device according to one embodiment of the present disclosure.

FIG. 5 shows a beamforming antenna device 500 according to one embodiment of the present disclosure. The beamforming antenna device 500 includes a plurality of antenna elements 210_1_1 to 210_N_X, a plurality of phase-align arrays 220_1 to 220_N, and a plurality of sub-arrays 230, where N and X are integers greater than 1. Similar to the beamforming antenna device 200, the antenna elements 210_1_1 to 210_N_X can be arranged as a phased-array. Each of the phase-align arrays 220_1 to 220_N is coupled to X antenna elements. Each of the sub-arrays 230 is coupled to a plurality of chain-structure arrays or a plurality of other sub-arrays 230. In such case, the phase-align arrays 220_1 to 220_N and the sub-arrays 230 are arranged in a chain structure. The beamforming antenna device 500 is similar to the beamforming antenna device 200 except that the beamforming antenna device 500 further comprises a bypass path 502. The bypass path 502 is arranged to bypass the middle sub-array 230 in case the middle sub-array 230 is defective to thereby improve the reliability of the beamforming antenna device. The detailed description of bypass path 502 will be described in paragraphs corresponding to FIG. 8.

Figure 6:
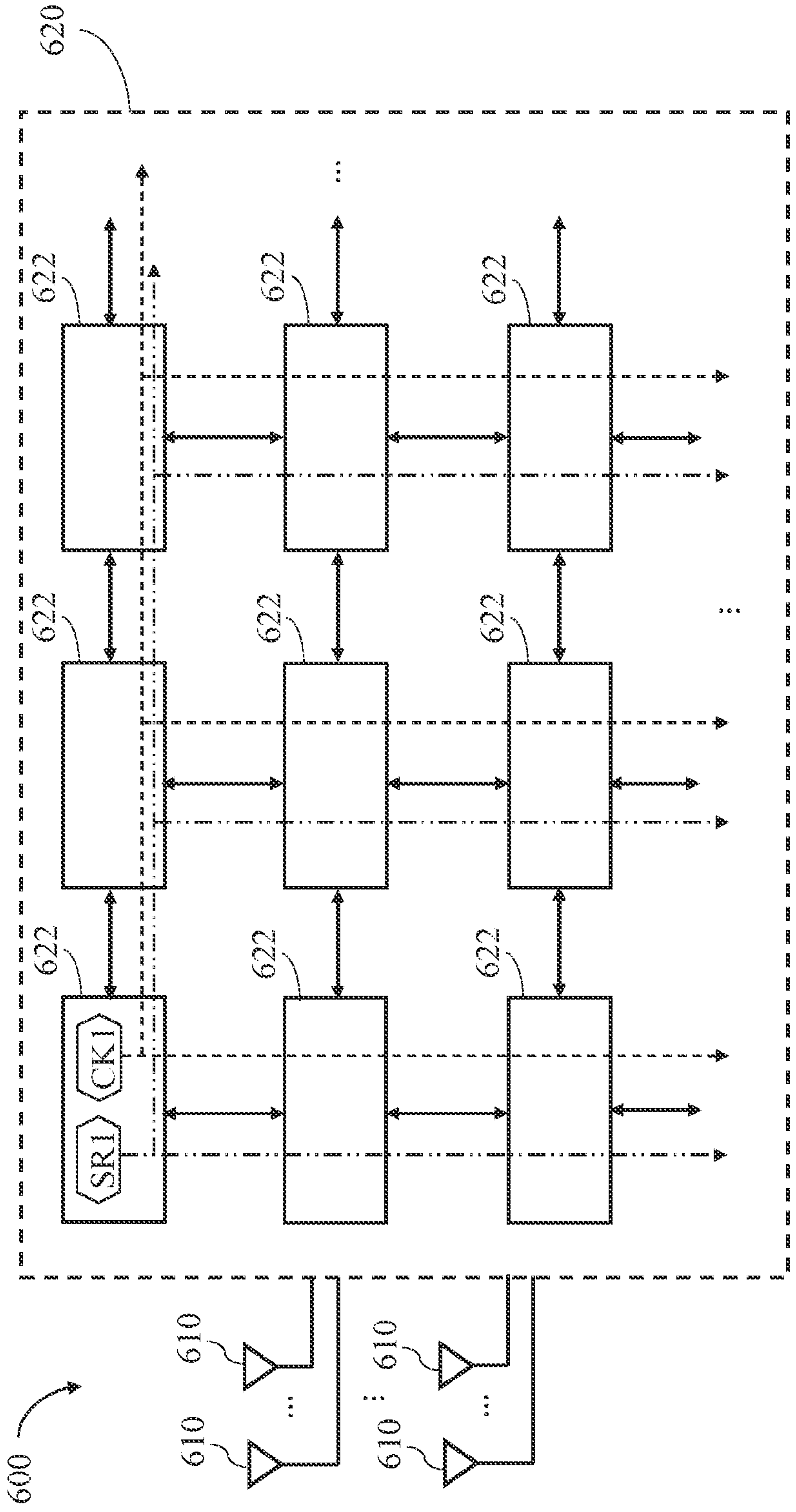
FIG. 6 shows a beamforming antenna device according to one embodiment of the present disclosure.

FIG. 6 shows a beamforming antenna device 600 according to one embodiment of the present disclosure. FIG. 6 is a more general diagram to illustrate the beamforming antenna device 500 as well as 200 in two-dimensional way. For simplicity, the beam forming antenna device 600 includes a plurality of antenna elements 610 and a sub-array network 620 coupled to the antenna elements 610. The sub-array network 620 includes a plurality of sub-arrays 622 having substantially the same structures, and each of the sub-arrays 622 is coupled to its adjacent sub-arrays 622. In the present embodiment, the antenna elements 610 can form a two-dimensional phased-array, and the sub-array network 620 can be a two-dimensional network. However, the present disclosure is not limited thereto. In some embodiments, the antenna elements 610 can form a multi-dimensional phased-array, and the sub-array network 620 can also be a multi-dimensional network according to the system requirements.

In the present embodiment, each of the sub-arrays 622 can include a plurality of switch units for controlling its electrical connections to the adjacent sub-arrays 622, therefore, each sub-array 622 is allowed to receive signals or data from any of its adjacent sub-arrays, and to transmit signals or data to any of its adjacent sub-arrays. In some embodiments, instead of being disposed within the sub-array 622, the switch units for controlling the electrical connection between adjacent sub-arrays 622 may also be disposed outside of the sub-arrays 622 (i.e., outside of the FPGA).

The distributed structure of the sub-array network 620 provides the user with great flexibility and extensibility when creating the data processing paths. That is, by properly configuring the switch units of the sub-arrays 622, desired data paths can be formed to aggregate the received antenna signals so as to derive the beamformed signal. Also, when the size of the phased array is changed, a corresponding data path can also be configured accordingly. That is, in addition to the tree structure adopted by the beamforming antenna device 100, the sub-array network 620 allows the user to build other types of data paths flexibly.

Figure 7:
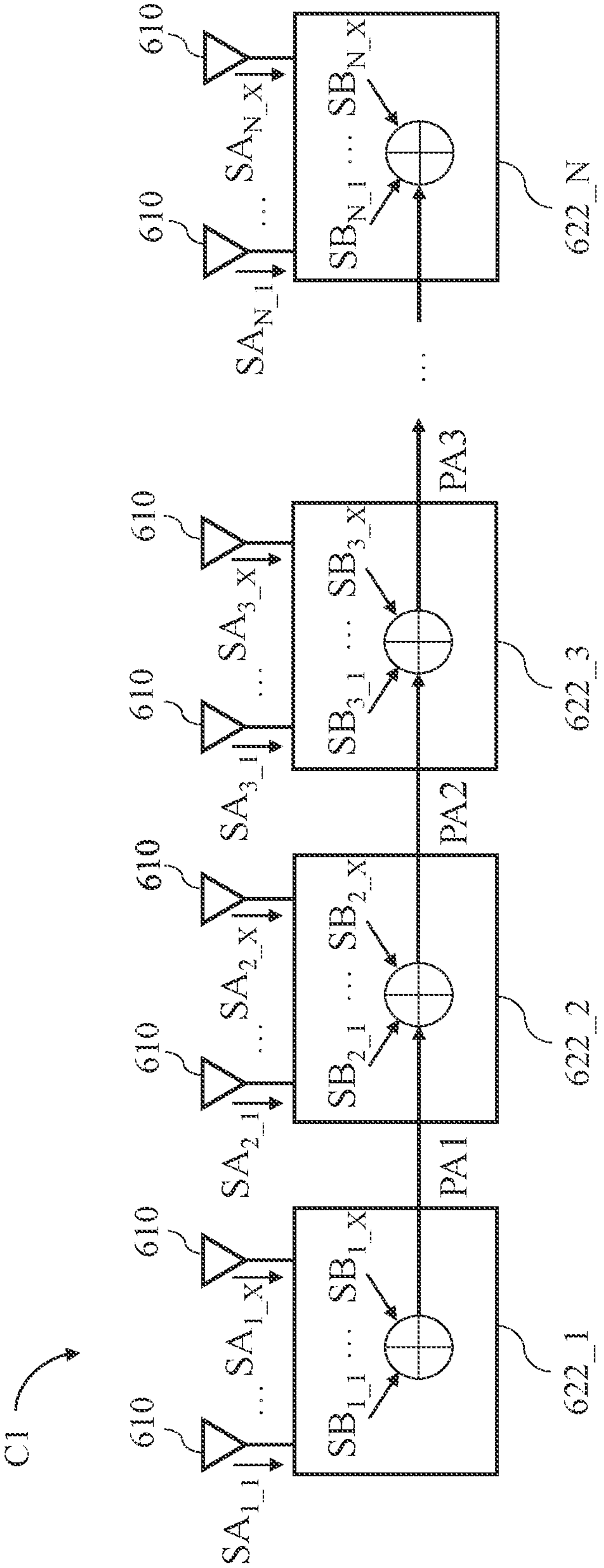
FIG. 7 shows a sub-array chain formed by sub-arrays in the sub-array network of FIG. 6.

For example, in some embodiments, a chain structure can be built with some of the sub-arrays 622 in the sub-array network 620 for performing phase alignment and signal aggregation. FIG. 7 shows a sub-array chain C1 formed by sub-arrays 622_1 to 622_N of the sub-arrays in the sub-array network 620.

In the present embodiment, the sub-arrays 622_1 to 622_N in the sub-array chain C1 can be coupled to a portion of the antenna elements 610 for receiving antenna signals and forming a corresponding beam. As shown in FIG. 7, each of the sub-arrays 622_1 to 622_N may be coupled to X antenna elements 610, where X is an integer greater than 1. In some embodiments, X can be 4 or 8; however, the present disclosure is not limited thereto.

In the receiving mode, the sub-arrays 622_1 to 622_N in the sub-array chain C1 can derive in-phase signals by performing phase align operations according to the antenna signals $SA_{1\_1}$ to $SA_{N\_X}$, and aggregate the in-phase signals along the sub-array chain C1 to generate the beamformed signal.

For example, as shown in FIG. 7, the sub-arrays 622_1 to 622_3 can be configured as three successive sub-arrays in the sub-array chain C1. In such case, the sub-array 622_1 can derive in-phase signals $SB_{1\_1}$ to $SB_{1\_X}$ according to antenna signals $SA_{1\_1}$ to $SA_{1\_X}$ received by antenna elements 610 coupled to the sub-array 622_1. After the in-phase signals $SB_{1\_1}$ to $SB_{1\_X}$ are derived, the sub-array 622_1 can combine the in-phase signals $SB_{1\_1}$ to $SB_{1\_X}$ to generate a partial aggregation result PA1 to the sub-array 622_2.

Similarly, the sub-array 622_2 can derive the in-phase signals $SB_{2\_1}$ to $SB_{2\_X}$ according to antenna signals $SA_{2\_1}$ to $SA_{2\_X}$ received by antenna elements 610 coupled to the sub-array 622_2. Furthermore, the sub-array 622_2 can receive the partial aggregation result PA1 from the sub-array 622_1, and combine the partial aggregation result PA1 and the in-phase signals $SB_{2\_1}$ to $SB_{2\_X}$ to generate a partial aggregation result PA2. In such case, the partial aggregation result PA2 is substantially equal to the aggregation result of the in-phase signals $SB_{1\_1}$ to $SB_{1\_X}$ and $SB_{2\_1}$ to $SB_{2\_X}$.

The partial aggregation result PA2 is then transmitted to the sub-array 622_3, and the sub-array 622_3 can further aggregate the partial aggregation result PA2 with the in-phase signals $SB_{3\_1}$ to $SB_{3\_X}$ derived according to the antenna signals $SA_{3\_1}$ to $SA_{3\_X}$, and so on. As a result, the aggregation of all in-phase signals can be achieved along the sub-array chain C1, and the beamformed signal can thus be derived according to the final aggregation result generated by the sub-array 622_N.

Since the structure of the sub-array chain C1 allows to achieve beamforming with each sub-array 622_1 to 622_N receiving data from only one other sub-array, the number of input/output ports (e.g., the number of SERDES ports) required by the sub-arrays 622_1 to 622_N can be significantly reduced. Furthermore, due to the flexibility provided by the beamforming antenna device 600, it is also feasible to form bypass paths along the sub-array chain C1, and thus, the sub-array chain C1 can be protected from broken by a single node failure.

Figure 8:
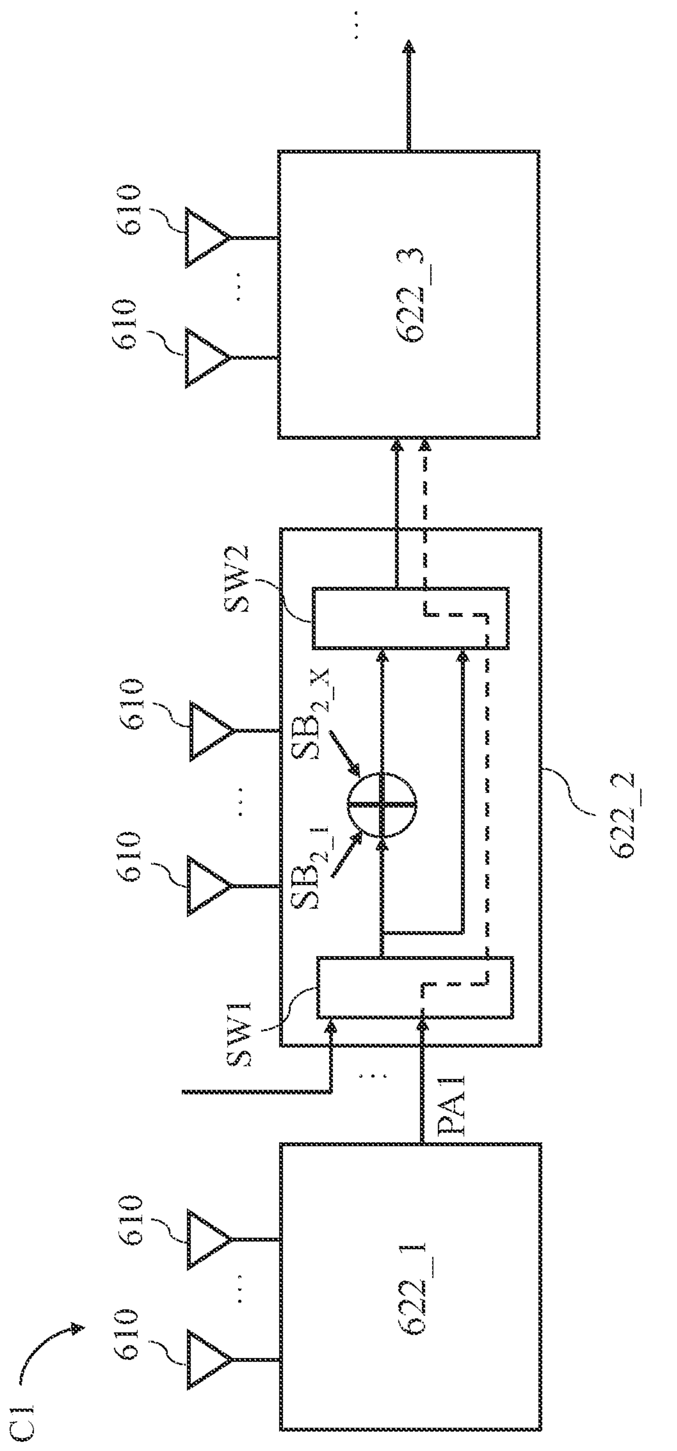
FIG. 8 shows the sub-array chain with a bypass path according to one embodiment of the present disclosure.

FIG. 8 shows the sub-array chain C1 with a bypass path according to one embodiment of the present disclosure. In the present embodiment, the beamforming antenna device 600 may periodically checking the status of each of the sub-arrays 622_1 to 622_N in the sub-array chain C1 so as to determine whether any of the sub-arrays 622_1 to 622_N functions abnormally. As shown in FIG. 8, when the sub-array 622_2 is determined to be failed or not functioning normally, the partial aggregation result PA1 outputted by the sub-array 622_1 can be bypassed to the sub-array 622_3 without being processed by the sub-array 622_2. In some embodiments, such bypass path can be enabled by configuring the switch units in the sub-array 622_2.

In FIG. 8, the sub-array 622_2 may include switch units SW1 and SW2. Since the sub-array 622_2 may receive data from any of its adjacent sub-arrays (e.g., as shown in FIG. 6, one sub-array may receive data from four adjacent sub-arrays at most), the switch unit SW1 can be used to select to receive data from which sub-array. In the present embodiment, the switch unit SW1 is configured to receive aggregation data from the sub-array 622_1. Furthermore, the switch unit SW2 can be used to select to transmit the aggregation data generated by the sub-array 622_2 or the aggregation data received from the switch unit SW1 to the sub-array 622_3.

Specifically, in a normal state, the switch unit SW1 can be configured to transmit the partial aggregation result PA1 outputted by the sub-array 622_1 to the processing units of the sub-array 622_2 so that the partial aggregation result PA1 can be combined with the in-phase signals $SB_{2\_1}$ to $SB_{2\_X}$. Afterwards, the switch unit SW2 can transmit the partial aggregation result PA2 generated by the sub-array 622_2 to the sub-array 622_3.

However, in a bypass state, the switch unit SW2 can be configured to transmit the partial aggregation result PA1 outputted by the sub-array 622_1 to the sub-array 622_3 directly without aggregating other signals.

In the present embodiment, the switch units in the sub-arrays 622 can be multiplexers and can be configured to change its state during the processing of the beamforming antenna device 600, therefore, the data paths of the sub-array chain C1 can be refined dynamically, thereby reducing the failure rate and improving the reliability. Furthermore, in addition to the data paths for beamforming signals, the sub-arrays may further include more switch units for controlling other signal paths. For example, the clock signal CK1 and the system reference signal SR1 that are used for synchronizing the sub-arrays 622 can be propagated in a node-to-node, in which one node may represent one sub-array, manner by configuring the corresponding switch units in the sub-arrays 622 of the sub-array network 620.

In the present embodiments, since each sub-array 622 may be implemented by a FPGA, clock domains of the sub-arrays 622 can be independent of each other. In such case, to synchronize all the sub-arrays 622 in the sub-array network 620, a master sub-array 622 may be selected to provide a clock signal CK1. For example, as shown in FIG. 6, the sub-array 622 at the left-upper corner of the sub-array network 620 can be selected as the master sub-array 622. In such case, the clock signal CK1 originated from the main sub-array 622 can be sequentially propagated through the rest of the sub-arrays 622 along the wires between adjacent sub-arrays 622. However, the present disclosure is not limited to the signal paths shown in FIG. 6. In some other embodiments, the user may configure the signal paths for propagating the clock signal CK1 according to the system needs.

In some embodiments, since all the sub-arrays 622 in the sub-array network 620 can have the similar structure, all the sub-arrays 622 may include a clock source that is able to provide the clock signal. In such case, all the sub-arrays 622 may be a candidate of the master sub-array or master node, and each of the sub-arrays 622 may adopt an clock switch unit to select a clock input signal from its neighboring sub-array 622 or the clock signal generated by its own clock source depending on whether it has been selected to be the master sub-array or not.

Also, when the sub-array chain C1 is activated to receive the antenna signals, the system reference signal SR1 may be transmitted to notify the sub-arrays 622 in the sub-array chain C1 for performing the phase align operations synchronously. In some embodiments, the system reference signal SR1 can also be generated by the master node, and can be sequentially propagated through the rest of the sub-arrays 622 in the manner of node-to-node transmission.

Figure 9:
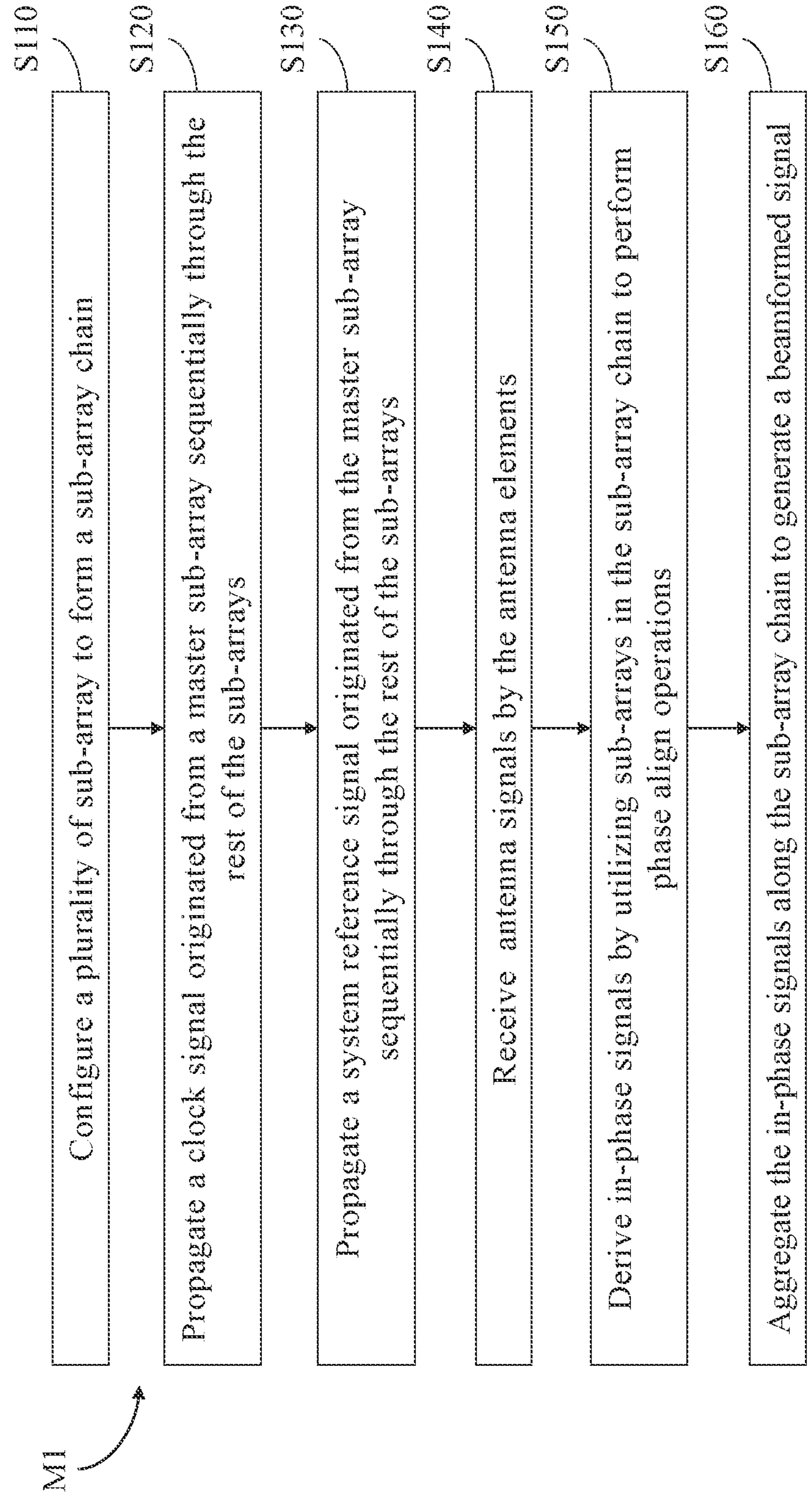
FIG. 9 shows a method for operating the beamforming antenna device FIG. 6 to generate the beamformed signal in the receiving mode.

FIG. 9 shows a method M1 for operating the beamforming antenna device 600 to generate the beamformed signal in the receiving mode. The method M1 includes steps S110 to S160. In step S110, the sub-array chain C1 can be formed by configuring the corresponding sub-arrays 622. For example, as shown in FIG. 7, sub-arrays 622_1 to 622_N are configured to form the sub-array chain C1.

Next, the clock signal CK1 and the system reference signal SR1 can be propagated to the sub-arrays 622_1 to 622_N in the sub-array chain C1 in step S120 and S130. In such case, the sub-arrays 622_1 to 622_N in the sub-array chain C1 would begin to receive the antenna signals received by the antenna elements 610 that are coupled to the sub-arrays 622_1 to 622_N in step S140. In step S150, the sub-arrays 622_1 to 622_N can derive the in-phase signals of the antenna signals by performing the phase align operations. Finally, in step S160, the sub-arrays 622_1 to 622_N can aggregate the in-phase signals along the sub-array chain C1 so as to generate the beamformed signal.

In some embodiments, since timing differences and the phase differences may be caused by the transmission along the sub-array chain C1, it can be crucial for the sub-arrays 622_1 to 622_N to compensate the timing difference and the phase difference when deriving the in-phase signals. In such case, to synthesize the delays on each sub-arrays 622 in the sub-array network 620 for calibration can help to improve the accuracy of beamforming.

In some embodiments, the delays on each sub-arrays 622 in the sub-array network 620 can be synthesized according to the summation of near-by delays between adjacent sub-arrays (i.e., the timing difference and the phase difference caused by transmission between two adjacent sub-arrays). More details about the calibration operation will be introduced with FIG. 15 and FIG. 16 later.

Figure 10:
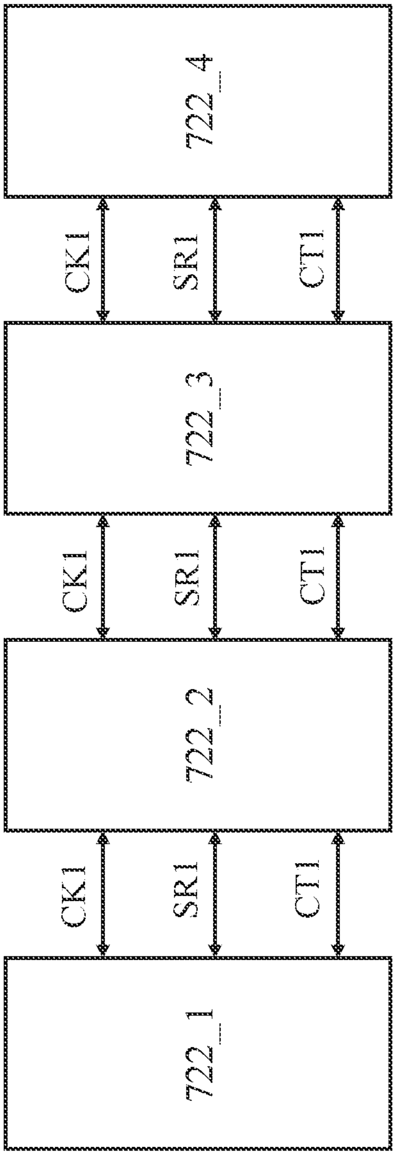
FIG. 10 shows a plurality of sub-arrays with a calibration wire network according to one embodiment of the present disclosure.

FIG. 10 shows a plurality of sub-arrays 722_1 to 722_4 with a calibration wire network according to one embodiment of the present disclosure. In the present embodiment, the sub-arrays 722_1 to 722_4 can form a sub-array chain, and can be adopted as a part of the beamforming antenna device 600. As shown in FIG. 10, each two adjacent sub-arrays of the sub-arrays 722_1 to 722_4 can be connected by clock wires for transmitting the clock signal CK1 in arbitrary directions, system wires for transmitting the system reference signal SR1 in arbitrary directions, and calibration wires for calibration test signal CT1 in arbitrary directions.

Figure 11:
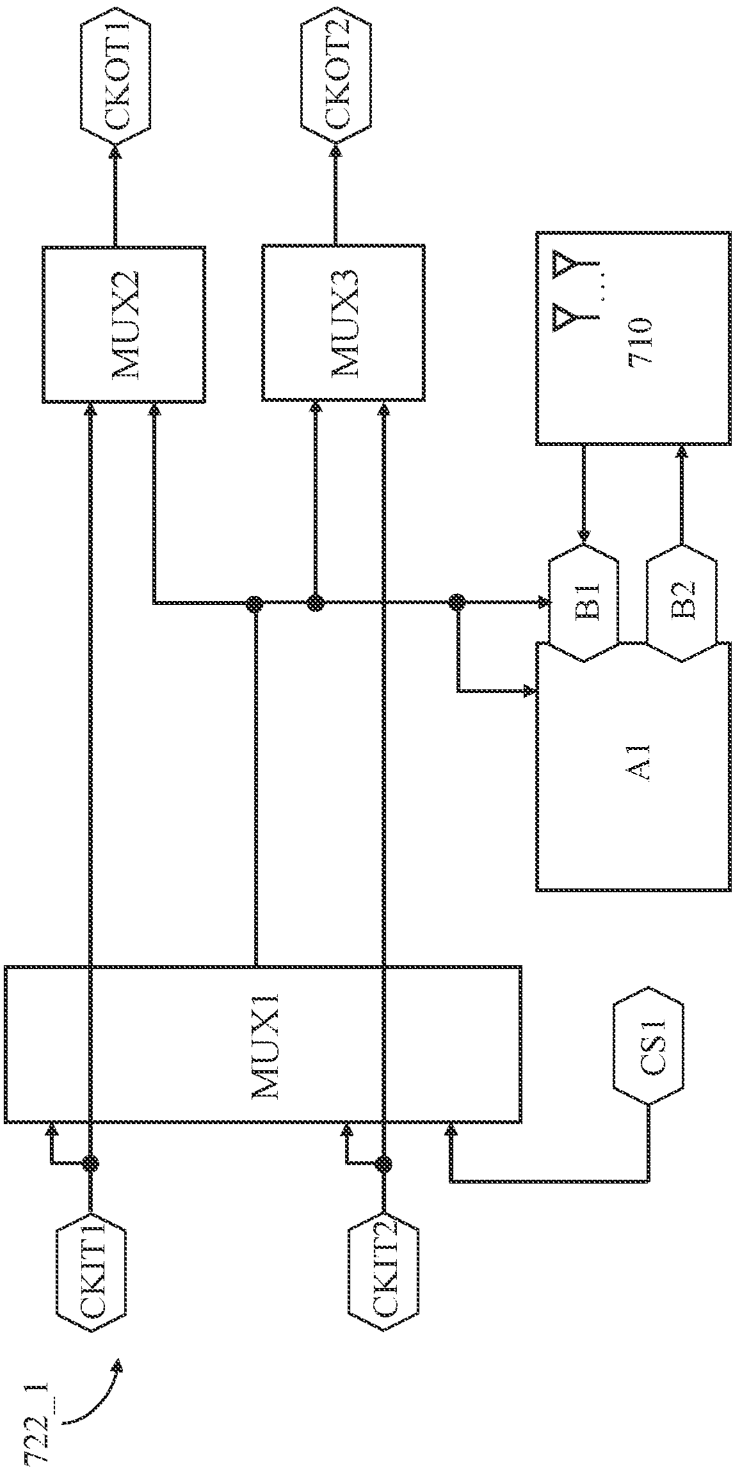
FIG. 11 shows a sub-array with a clock network according to one embodiment of the present disclosure.

FIG. 11 shows a sub-array 722_1 with a clock network according to one embodiment of the present disclosure. As shown in FIG. 11, the clock network includes clock input terminals CKIT1 and CKIT2, multiplexers MUX1, MUX2 and MUX3, and clock output terminals CKOT1 and CKOT2. The multiplexer MUX1 may select a clock signal received from the clock input terminal CKIT1, a clock signal received from the clock input terminal CKIT2, or a clock signal generated by the clock source CS1 of the sub-array 722_1 to be the selected clock signal for operations. For example, the sub-array 722_1 may include a data processing unit A1, an analog-to-digital converter B1, and a digital-to-analog converter B2. The data processing unit A1 may generate an output digital signal for transmitting, and the digital-to-analog converter B2 can convert the output digital signal into an output analog signal so that the output analog signal can be transmitted through the phased antenna array 710. Also, an input analog signal received by the phased antenna array 710 can be converted into an input digital signal by the analog-to-digital converter B1, so that the data processing unit A1 can process the input digital signal accordingly.

In such case, the selected clock signal outputted by the multiplexer MUX1 can be fed to the data process unit A1, the analog-to-digital converter B1, and the digital-to-analog converter B2 of the sub-array 722_1. Furthermore, the selected clock signal can be outputted to the clock output terminals CKOT1 and CKOT2 so as to propagate the clock signal to other sub-arrays adjacent to the sub-array 722_1. However, in some cases, if the sub-array 722_1 is not enabled for signal processing, then the clock received by the clock input terminals CKIT1 and CKIT2 may be bypassed to the clock output terminals CKOT1 and CKOT2 through the multiplexer MUX2 and MUX3. In some embodiments, the clock network of the sub-array 722_1 may include more clock input terminals and/or more clock output terminals according to the number of adjacent sub-arrays that are coupled to the sub-array 722_1 in the beamforming antenna device.

Figure 12:
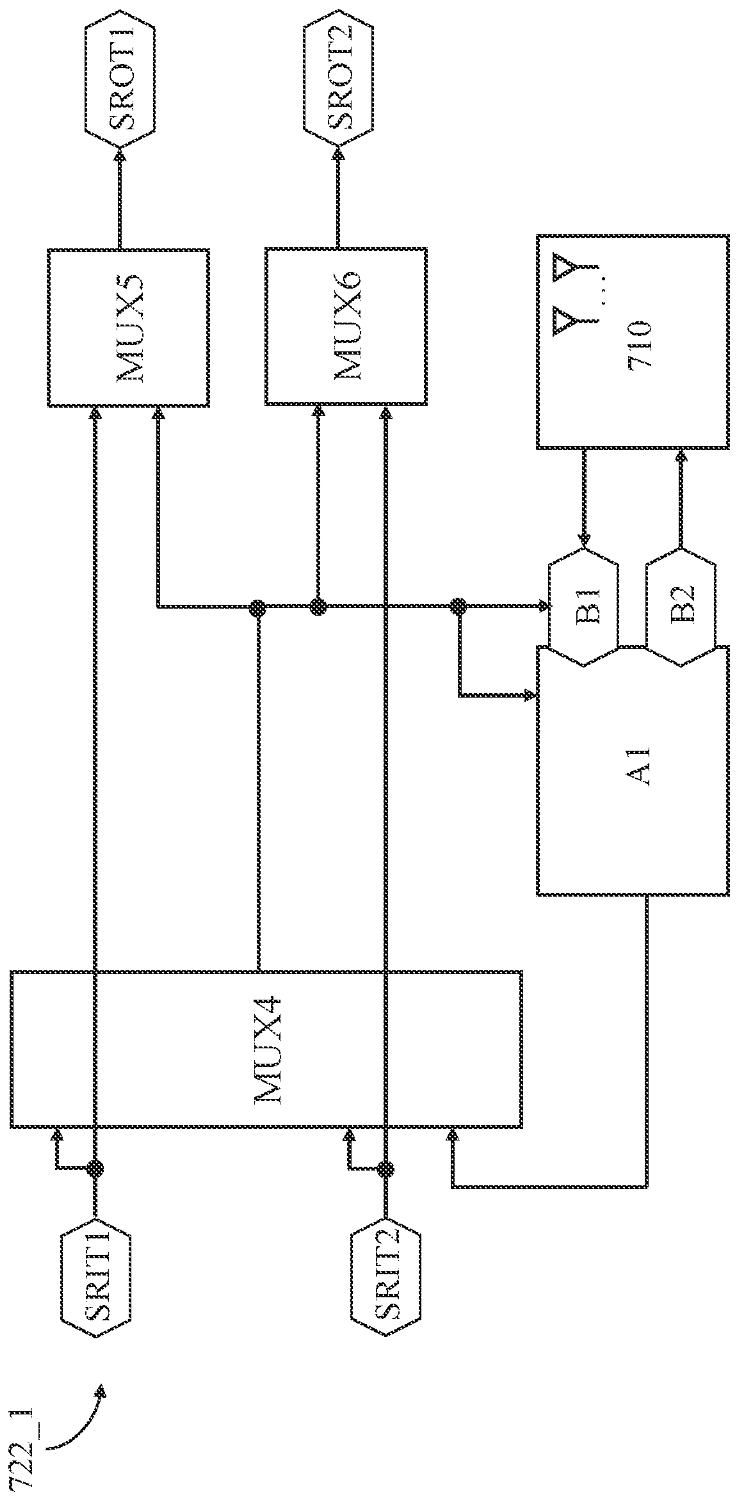
FIG. 12 shows a sub-array with a system signal network according to one embodiment of the present disclosure.

FIG. 12 shows the sub-array 722_1 with a system signal network according to one embodiment of the present disclosure. As shown in FIG. 12, the system signal network includes system input terminals SRIT1 and SRIT2, multiplexer MUX4, MUX5 and MUX6, and system output terminals SROT1 and SROT2. The multiplexer MUX4 may select a system reference signal received from the system input terminal SRIT1, a system reference signal received from the system input terminal SRIT2, or a system reference signal generated by the data processing unit A1 of the sub-array 722_1 to be the selected system reference signal for operations.

In such case, the selected system reference signal outputted by the multiplexer MUX4 can be fed to the data process unit A1, the analog-to-digital converter B1, and the digital-to-analog converter B2 of the sub-array 722_1. Furthermore, the selected system reference signal can be outputted to the system output terminals SROT1 and SROT2 so as to propagate the system reference signal to other sub-arrays adjacent to the sub-array 722_1. However, in some cases, if the sub-array 722_1 is not enabled for signal processing, then the system reference signal received by the system input terminals SRIT1 and SRIT2 may be bypassed to the system output terminals SROT1 and SROT2 through the multiplexer MUX5 and MUX6. In some embodiments, the system signal network of the sub-array 722_1 may include more system input terminals and/or more system output terminals according to the number of adjacent sub-arrays that are coupled to the sub-array 722_1 in the beamforming antenna device.

Figure 13:
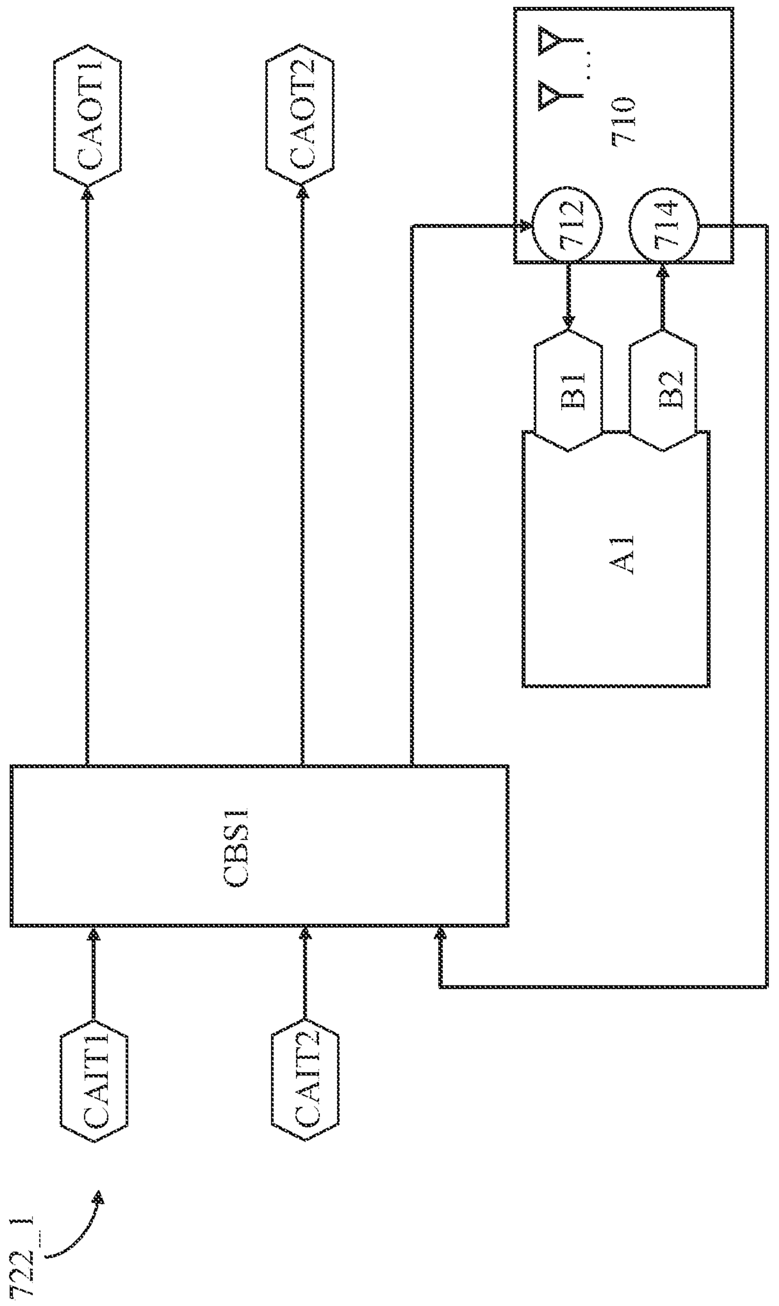
FIG. 13 shows a sub-array with a calibration wire network according to one embodiment of the present disclosure.

FIG. 13 shows a sub-array 722_1 with a calibration wire network according to one embodiment of the present disclosure. As shown in FIG. 13, the calibration wire network includes calibration input terminals CAIT1 and CAIT2, a combiner/splitter CBS1, and calibration output terminals CAOT1 and CAOT2. The combiner/splitter CBS1 may direct a calibration test signal received from the calibration input terminal CAIT1, a calibration test signal received from the calibration input terminal CAIT2, or a calibration test signal generated by a transmitter feed 714 of the phased antenna array 710 to the calibration output terminal CAOT1, the calibration output terminal CAOT2, and/or the receiver sink 712 of the phased antenna array 710 according to the calibration operations. In some embodiments, the calibration network of the sub-array 722_1 may include more calibration input terminals and/or more calibration output terminals according to the number of adjacent sub-arrays that are coupled to the sub-array 722_1 in the beamforming antenna device.

Figure 14:
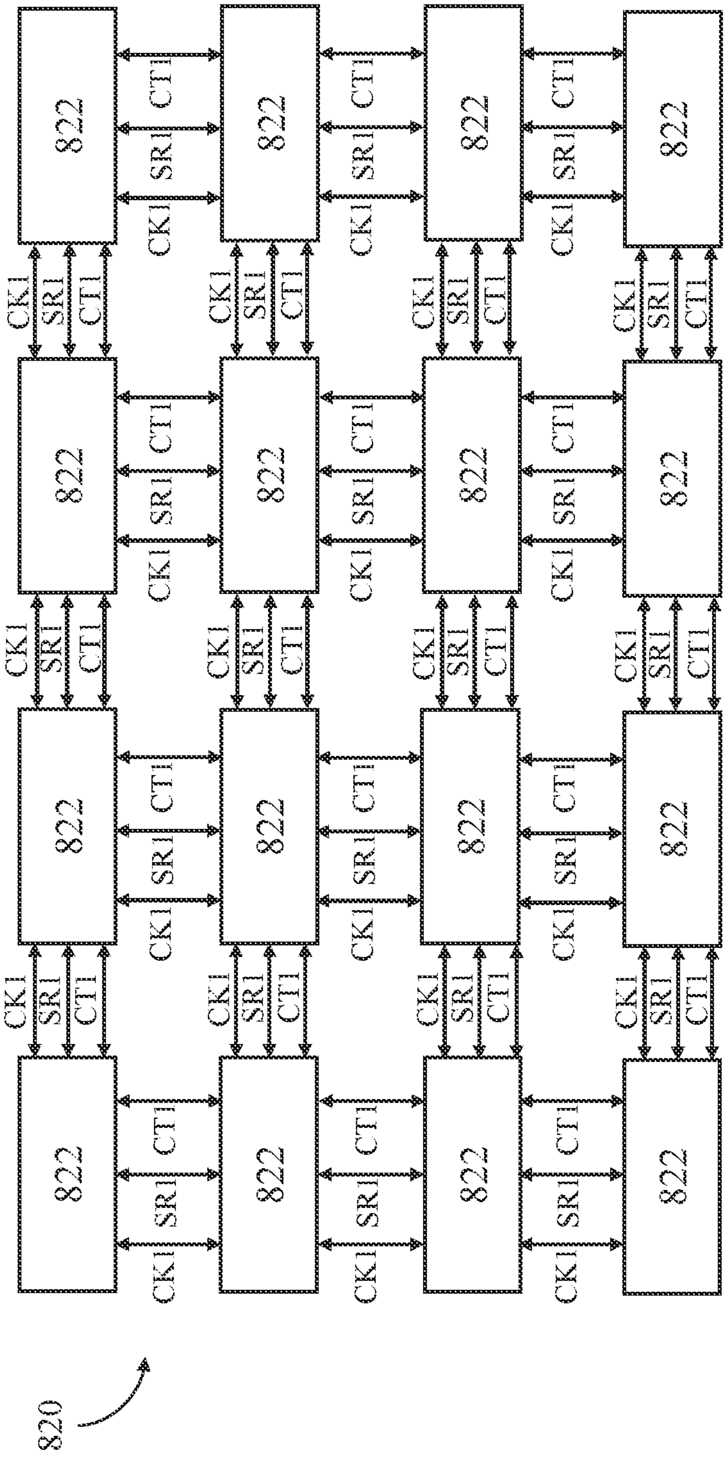
FIG. 14 shows a 2-dimension beamforming network according to one embodiment of the present disclosure.

FIG. 14 shows a 2-dimension beamforming network 820 according to one embodiment of the present disclosure. As shown in FIG. 14, the beamforming network 820 includes a plurality of sub-arrays 822. In the present embodiment, each of the sub-arrays 822 may have a structure similar to that of the sub-array 722_1 shown in FIGS. 11 to 13. In addition, each two adjacent sub-arrays 822 can be connected by clock wires for transmitting the clock signal CK1 in arbitrary directions, system wires for transmitting the system reference signal SR1 in arbitrary directions, and calibration wires for calibration test signal CT1 in arbitrary directions. Furthermore, each two adjacent sub-arrays 822 can further be connected by data wires (not shown) for transmitting the in-phased signals to be aggregated.

Figure 15:
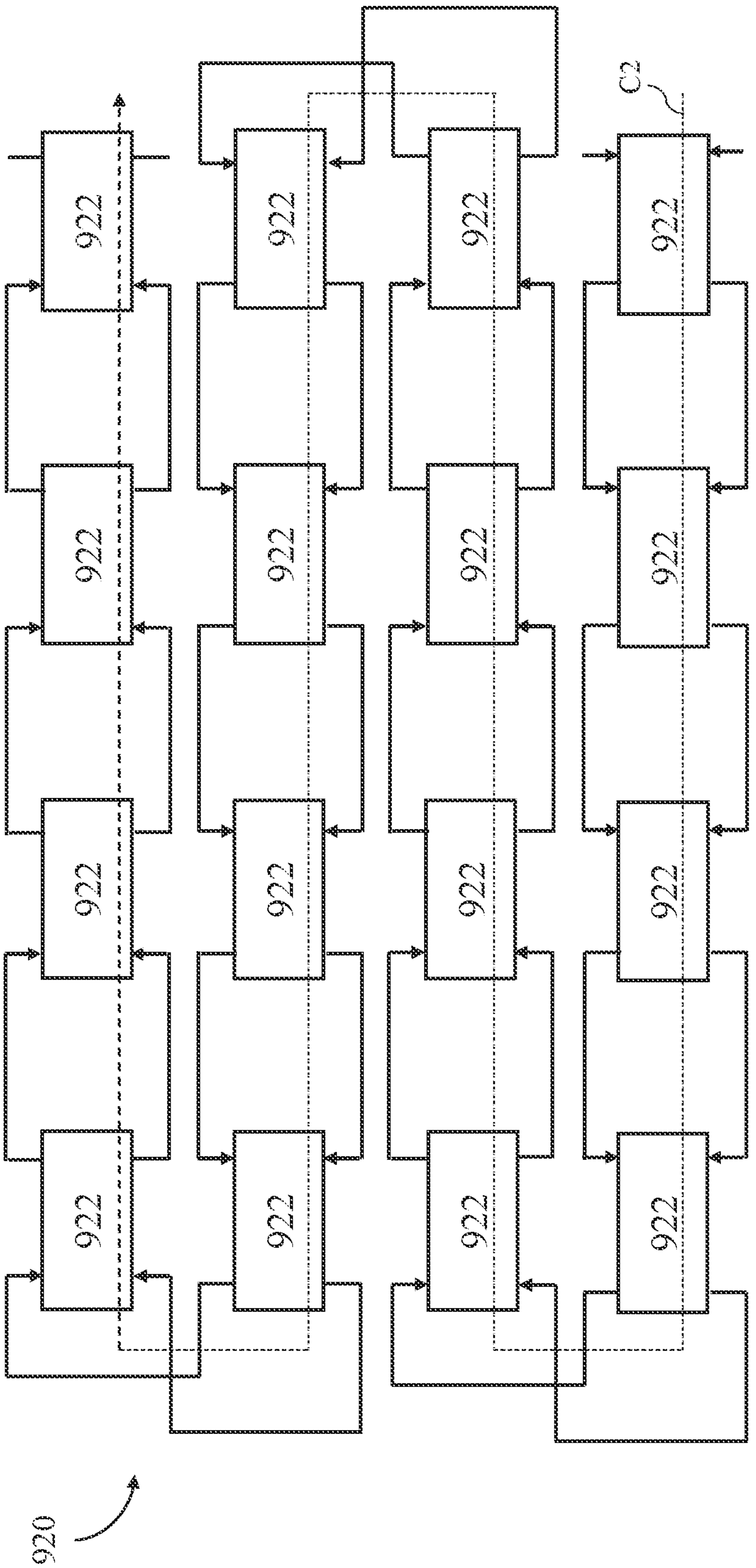
FIG. 15 shows a sub-array network according to one embodiment of the present disclosure.
Figure 16:
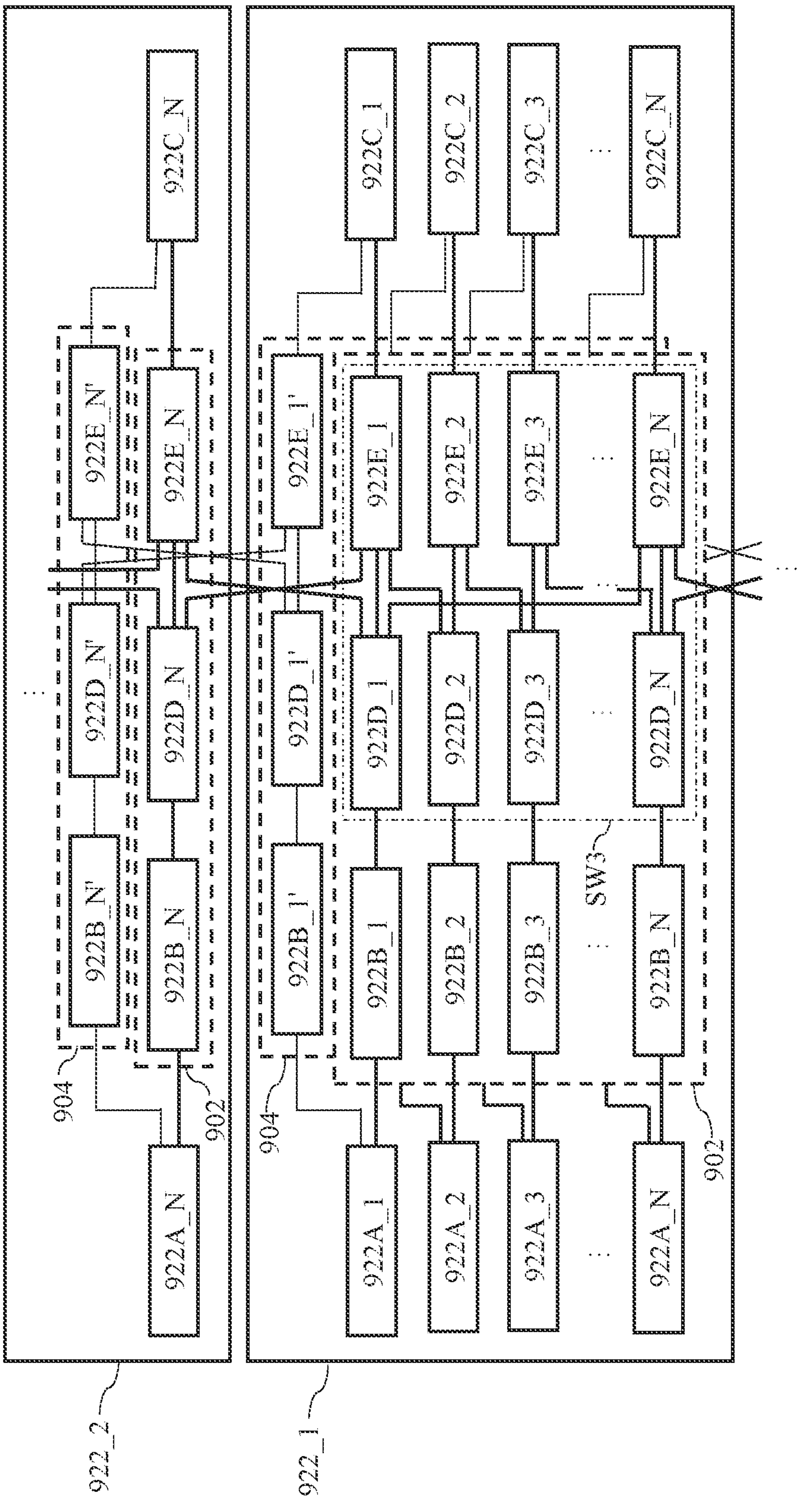
FIG. 16 shows a close look of the sub-arrays in FIG. 15 according to one embodiment of the present disclosure.

FIG. 15 shows a sub-array network 920 according to one embodiment of the present disclosure. The sub-array network 920 comprises a plurality of sub-arrays 922 that are configured as a sub-array chain C2. FIG. 16 further shows a close look of the sub-array 922_1 and the sub-array 922_2, where the sub-array 922_1 and the sub-array 922_2 can be any two adjacent sub-arrays 922 that are coupled to each other in FIG. 15.

As shown in FIG. 16, the sub-array 922_1 includes a plurality of data processing units 922A_1 to 922A_N, a main path 902, a calibration path 904, and a plurality of frontend circuits 922C_1 to 922C_N. The main path 902 comprises a plurality of data conversion circuits 922B_1 to 922B_N, and a switch unit SW3. The switch unit SW3 can control the electric connections between the data conversion circuits 922B_1 to 922B_N and the frontend circuits 922C_1 to 922C_N. In the present embodiment, the switch unit SW3 includes a plurality of first switches 922D_1 to 922D_N, and a plurality of second switches 922E_1 to 922E_N. Moreover, the calibration path 904 is a counterpart of the main path 902, and the components of the calibration path 904 are similar to the components of the main path 902 (for example, the calibration path 904 also includes data conversion circuits 922B_1', and switches 922D_1' and 922E_1'), thus the detailed connectivity among the components of the calibration path 904 is omitted here for brevity. In some embodiments, the sub-array 922_1 and the sub-array 922_2 have the same structures, however, for brevity, in FIG. 16, only parts of the components are shown in the sub-array 922_2.

In the present embodiment, each of the frontend circuits 922C_1 to 922C_N can receive signals from an antenna element (not shown) in the receiving mode and transmit signals to the antenna element in the transmitting mode. Each of the data conversion circuits 922B_1 to 922B_N can convert an analog receiving signal into a digital receiving signal for processing in the receiving mode and convert a digital transmitting signal into an analog transmitting signal for transmission in the transmitting mode. Each of the data processing units 922A_1 to 922A_N is coupled to a corresponding data conversion circuit of the data conversion circuits 922B_1 to 922B_N, and can perform a phase align operation to the digital receiving signal in the receiving mode and generate the digital transmitting signal in the transmitting mode.

For example, in the transmitting mode, the data process unit 922A_1 may transmit a digital transmitting signal to the data conversion circuit 922B_1, and the data conversion circuit 922B_1 can convert the digital transmitting signal into an analog transmitting signal and send it to the frontend circuit 922C_1 through the switches 922D_1 and 922E_1. Finally, the frontend circuit 922C_1 can send the analog transmitting signal to the corresponding antenna element 110 for transmission.

Also, in the receiving mode, the frontend circuit 922C_1 may receive the analog receiving signal from the corresponding antenna element, and the analog receiving signal can be transmitted to the data conversion circuit 922B_1 through the switches 922D_1 and 922E_1. The data conversion circuit 922B_1 can convert the analog receiving signal into a digital receiving signal so that the data processing unit 922A_1 can process the digital receiving data to derive the in-phase signal accordingly.

In the transmitting mode, the switches 922D_1 and 922E_1 of the sub-array 922_1 may lead the analog transmitting signal from the data conversion circuit 922B_1 to the frontend circuit 922C_1 for transmission. However, to synthesize the near-by transmitting delay between the two adjacent sub-arrays in a transmitting calibration mode, the analog transmitting signal generated by one sub-array may be transmitted to a frontend circuit of another sub-array through the switches of the sub-arrays.

For example, in the transmitting calibration mode, the sub-array 922_1 can send a first test signal to the frontend circuit 922C_N of the sub-array 922_2, and the sub-array 922_2 can send a second test signal to the frontend circuit 922C_N of the sub-array 922C_N so as to estimate a transmitting delay between the sub-array 922_1 and the sub-array 922_2.

Specifically, in the transmitting calibration mode, the data process unit 922A_1 of the sub-array 922_1 can transmit the first test signal (e.g., a training sequence such as a chirp signal) to the frontend circuit 922C_N of the sub-array 922_2 through the data conversion circuit 922B_1, the switch 922D_1 of the sub-array 922_1, and the switch 922E_N of the sub-array 922_2. After the frontend circuit 922C_N receives the first test signal, it can further transmit the received signal to the data processing unit 922A_N of the sub-array 922_2 through the switches 922D_N' and 922E_N' and the data conversion circuit 922B_N' in the calibration path 904 of the sub-array 922_2.

Next, the data process unit 922A_N of the sub-array 922_2 can also transmit a second test signal, which has a same waveform as that of the first test signal, to the frontend circuit 922C_N of the first sub-array 922_2 with the aid of the switches 922D_N and 922_E_N of the sub-array 922_2. After the frontend circuit 922C_N of the sub-array 922_2 receives the second test signal, it can further transmit the received signal to the data processing unit 922A_N of the sub-array 922_2 through the switches 922D_N' and 922E_N' and the data conversion circuit 922B_N' in the calibration path 904 of the sub-array 922_2.

In such case, the waveforms of the first test signal and the second test signal received by the sub-array 922_2 may turn out to have different waveforms due to the near-by delay. In some embodiments, the sub-array network 920 may transform the waveforms from the time domain to the frequency domain by using Fast Fourier Transform (FFT) so as to estimate the timing difference and the phase difference between the signals received by the sub-array 922_2. Consequently, the near-by transmitting delay between these two sub-arrays 922_1 and 922_2 can be estimated.

With similar approaches, the sub-array network 920 is able to estimate all the near-by transmitting delays between adjacent sub-array, and thus, the breamforming antenna device 920 can further obtain the transmitting delay for each of the sub-array 922 in the sub-array chain C2 with respect to the reference sub-array (e.g., the sub-array 922_1) according to all the estimated the near-by delays. For example, if a near-by delay between the sub-arrays 922_*i* and 922_(*i*+1) is denoted as $U_i$, where i is a positive integer smaller than N, then the receiving delay of the sub-array 922_N with respect to the sub-array 922_1 would be $$\sum_{i=1}^{i=N-1} U_i.$$

In addition, in a receiving calibration mode, the sub-array 922_1 can send a first test signal to the frontend circuit 922C_1 of the sub-array 922_1 and send a second test signal, which has a same waveform as that of the first test signal, to the frontend circuit 922C_N of the sub-array 922_2 so as to estimate a receiving delay between the sub-array 922_1 and the sub-array 922_2.

For example, in the receiving calibration mode, the data process unit 922A_1 of the sub-array 922_1 may transmit a first test signal to the frontend circuit 922C_1 of the sub-array 922_1 through the data conversion circuit 922B_1, the switches 922D_1 and 922E_1 in the main path 902 of the sub-array 922_1. After the frontend circuit 922C_1 of the sub-array 922_1 receives the first test signal, it can further transmit the received signal to the data processing unit 922A_N of the sub-array 922_2 through the switch 922E_1' of the sub-array 922_1 and the switch 922D_N' and the data conversion circuit 922B_N' in the calibration path 904 of the sub-array 922_2.

Next, the data process unit 922A_1 of the sub-array 922_1 can also transmit a second test signal to the frontend circuit 922C_N of the sub-array 922_2 with the aid of the switch 922D_1 of the sub-array 922_1 and the switch 922E_N of the sub-array 922_2. After the frontend circuit 922C_N receives the second test signal, it can further transmit the received signal to the data processing unit 922A_N of the sub-array 922_2 through the switches 922E_N' and 922D_N', and the data conversion circuit 922B_N' of the sub-array 922_2. As a result, with the transmitting delay estimated previously, the sub-array network 920 can further estimate the receiving delay between the sub-array 922_1 and the sub-array 922_2 according to the waveforms of the signals received by the sub-array 922_2.

In the present embodiment, to present the calibration network of the sub-array network 920 in the calibration modes (i.e., the transmitting calibration mode and the receiving calibration mode aforementioned) clearly, FIG. 15 only shows two calibration wires between each two adjacent sub-arrays. For example, only the calibration wire between the switch 922D_1 of the sub-array 922_1 and the switch 922E_N of the sub-array 922_2 that is used in the aforementioned transmitting calibration mode and the calibration wire between the switch 922E_1' of the sub-array 922_1 and the switch 922D_N' of the sub-array 922_2 that is used in the aforementioned receiving calibration mode are shown in FIG. 15. That is, in addition to the calibration wires shown in FIG. 15, the sub-array network 920 also includes other calibration wires as well as other wires for transmitting the clock signal, wires for transmitting the system reference signal, and the wires for transmitting aggregation data.

Furthermore, in some embodiments, the internal delays among the frontend circuits 922C_1 to 922C_N within the sub-array 922_1 may also be estimated by performing an intra-node calibration. In some embodiments, such internal delay can be synthesized with the aids of the first switches 922D_1 to 922D_N and the second switches 922E_1 to 922E_N.

As shown in FIG. 16, the first switches 922D_1 to 922D_N and the second switches 922E_1 to 922E_N are arranged for controlling the electrical connections between the data conversion circuits 922B_1 to 922B_N and the frontend circuits 922C_1 to 922C_N in the sub-array 922_1. For example, the switches 922D_2 can be coupled to the switches 922E_1 and 922E_2 for transmitting the output signal of data conversion circuit 922B_2 to the frontend circuit 922C_1 and 922C_2 in the sub-array 922_1. Also, the switches 922D_1 can be coupled to the switches 922E_1 and 922E_N for transmitting the output signal of data conversion circuit 922B_1 to the frontend circuit 922C_1 and 922C_N in the sub-array 922_1. In some embodiments, the first switches 922D_1 to 922D_N and the second switches 922E_1 to 922E_N may be implemented by a plurality of multiplexers.

In an intra-node calibration mode of the sub-array 922_1, for example, the data process unit 922A_2 may transmit same test signals to the frontend circuits 922C_2 and 922C_1 through the switches 922D_2, 922E_2, and 922E_1, and the test signals can be transmitted to the data processing unit 922A_1 through the switches (not shown) in the calibration path 904, so that the intra-node delay between the frontend circuit 922C_2 and the frontend circuit 922C_1 can be estimated according to the waveforms of the signals received by the frontend circuits 922C_1 and 922C_2. Similar approaches can be applied to the rest of frontend circuits 922C_3 to 922C_N with respect to the sub-array 922_1 so as to obtain the full intra-node delay.

Although the switch unit SW3 shown in FIG. 16 includes the switches 922D_1 to 922D_N and 922E_1 to 922E_N, the present disclosure is not limited thereto. In some other embodiments, the switch unit SW3 may have different routing structure that can enable the desired calibration modes for synthesize the delays between different paths within one sub-array and the delays between different sub-arrays.

By performing calibrations to estimate the delays on each sub-arrays in the sub-array chain, the phase alignment can be performed more accurately, thereby improving the quality of the beamformed signals.

In summary, the beamforming antenna devices provided by the embodiments of the present disclosure have distributed structures, and thus allow the user to flexibly configure the data path for in-phase signal aggregation. For example, a sub-array chain structure can be implemented by configuring the sub-arrays in the beamforming antenna devices. In such case, each sub-arrays only requires a small number of input/output ports (i.e., low fan-in/fan-out). Furthermore, the structure of sub-array chain also provides great extensibility. That is, when the size of the phased-array increases, the sub-array chain can extend its support by simply cascading more sub-arrays to the chain. In addition, with the flexible structure of the sub-array network, a bypass path can be provided when a sub-array in the sub-array chain is failed, thereby improving the reliability of the beamforming antenna device.

Although the present disclosure and its advantages have been described in detail, it should be understood that various changes, substitutions and alterations can be made herein without departing from the spirit and scope of the disclosure as defined by the appended claims. For example, many of the operations discussed above can be implemented in different methodologies and replaced by other operations, or a combination thereof.

Moreover, the scope of the present application is not intended to be limited to the particular embodiments of the operation, machine, manufacture, composition of matter, means, methods and steps described in the specification. As one of ordinary skill in the art will readily appreciate from the present disclosure, operations, machines, manufacture, compositions of matter, means, methods, or steps, presently existing or later to be developed, that perform substantially the same function or achieve substantially the same result as the corresponding embodiments described herein, may be utilized according to the present disclosure. Accordingly, the appended claims are intended to include within their scope such operations, machines, manufacture, compositions of matter, means, methods, and steps.

What is claimed is:

1. A beamforming antenna device, comprising:

a plurality of antenna elements; and a plurality of sub-arrays, coupled to the plurality of antenna elements, wherein each of the sub-arrays is coupled to its adjacent sub-arrays of the plurality of sub-arrays, and at least a portion of the plurality of sub-arrays form a sub-array chain;

wherein each of the plurality of sub-arrays comprises:

a plurality of frontend circuits, wherein each of the plurality of frontend circuits is configured to both receive signals from an antenna element and to transmit signals to the antenna element;

a main path comprising:

a plurality of first data conversion circuits, coupled to the plurality of frontend circuits, and each configured to both convert an analog receiving signal to a digital received signal for processing and convert a digital transmitting signal to an analog transmitting signal for transmission; and a switch unit;

a plurality of data process units, each coupled to a corresponding data conversion circuit of the plurality of first data conversion circuits through the switch unit, and configured to perform a phase align operation to the digital received signal and generate the digital transmitting signal, and a calibration path having a substantially same structure as that of the main path, wherein the calibration path comprises a plurality of second data conversion circuits coupled to the plurality of frontend circuits, and a switch coupled to the plurality of data process units and the plurality of second data conversion circuits of the calibration path, and the calibration path is configured to perform an intra-node calibration to estimate internal delays among the plurality of frontend circuits within each of the sub-arrays.

2. The beamforming antenna device of claim 1, wherein a clock signal originated from a master sub-array of the sub-arrays is sequentially propagated through the rest of the sub-arrays; and in a receiving mode, the sub-arrays in the sub-array chain are configured to derive in-phase signals by performing phase align operations according to antenna signals received by the antenna elements, and aggregate the in-phase signals along the sub-array chain to generate a beamformed signal.

3. The beamforming antenna device of claim 2, wherein:

the sub-arrays in the sub-array chain comprise a first sub-array, a second sub-array, and a third sub-array;

the first sub-array is configured to derive first in-phase signals according to antenna signals received by antenna elements coupled to the first sub-array, and combine at least the first in-phase signals to generate a first partial aggregation result to the second sub-array;

the second sub-array is configured to derive second in-phase signals according to antenna signals received by antenna elements coupled to the second sub-array, receive the first partial aggregation result from the first sub-array, and combine the first partial aggregation result and the second in-phase signals to generate a second partial aggregation result to the third sub-array; and when the second sub-array is determined to be failed, the first partial aggregation result outputted by the first sub-array is bypassed to the third sub-array without being processed by the second sub-array.

4. The beamforming antenna device of claim 3, further comprising a switch unit, configured to transmit the first partial aggregation result outputted by the first sub-array to the third sub-array so as to bypass the second sub-array in a bypass state, and transmit the second partial aggregation result generated by the second sub-array to the third sub-array in a normal state, wherein the switch unit is disposed inside the second sub-array or outside the second sub-array.

5. The beamforming antenna device of claim 2, wherein a system reference signal originated from the master sub-array is sequentially propagated through the rest of the plurality of sub-arrays, and the system reference signal is configured to synchronize the sub-arrays in the sub-array chain for performing the phase align operations.

6. The beamforming antenna device of claim 1, wherein the switch unit comprises a plurality of switches and is configured to control electric connections between the plurality of data conversion circuits and the plurality of frontend circuits for internal calibration.

7. The beamforming antenna device of claim 1, wherein:

the sub-arrays in the sub-array chain comprise a first sub-array, and a second sub-array adjacent to the first sub-array; and in a receiving calibration mode, the first sub-array is configured to send a first test signal to a frontend circuit of the first sub-array and a second test signal to a frontend circuit of the second sub-array so as to estimate a receiving delay between the first sub-array and the second sub-array.

8. The beamforming antenna device of claim 1, wherein:

the sub-arrays in the sub-array chain comprise a first sub-array, and a second sub-array adjacent to the first sub-array; and in a transmitting calibration mode, the first sub-array is configured to send a first test signal to a frontend circuit of the second sub-array, and the second sub-array is configured to send a second test signal to the frontend circuit of the second sub-array so as to estimate a transmitting delay between the first sub-array and the second sub-array.

9. The beamforming antenna device of claim 1, further comprising a plurality of switch units, configured to control electrical connections between adjacent sub-arrays so as to form the sub-array chain.

10. A method for operating a beamforming antenna device, wherein the beamforming antenna device comprises a plurality of antenna elements and a plurality of sub-arrays coupled to the plurality of antenna elements, each of the plurality of sub-arrays comprising a plurality of frontend circuits, a plurality of first data conversion circuits of a main path coupled to the plurality of frontend circuits, a plurality of second data conversion circuits of a calibration path coupled to the plurality of frontend circuits, and a plurality of data process units coupled to the plurality of first data conversion circuits and plurality of second data conversion circuits, the method comprises:

propagating a clock signal originated from a master sub-array of the plurality of sub-array sequentially through the rest of the plurality of sub-arrays in a manner of node-to-node transmission;

receiving a plurality of antenna signals by the plurality of antenna elements;

deriving in-phase signals by utilizing at least a portion of the plurality of sub-arrays in a sub-array chain to perform phase align operations according to antenna signals received by antenna elements that are coupled to the sub-arrays in the sub-array chain;

aggregating the in-phase signals along the sub-array chain to generate a beamformed signal;

in a transmitting mode, the plurality of data process units generating a plurality of digital transmitting signals to the plurality of first data conversion circuits, the plurality of first data conversion circuits converting the plurality of digital transmitting signals to a plurality of analog transmitting signals, and the plurality of frontend circuits transmitting the plurality of analog transmitting signals to antenna elements coupled to each of the plurality of sub-arrays;

in a receiving mode, the plurality of frontend circuits receiving a plurality of analog receiving signals from the antenna elements coupled to each of the plurality of sub-arrays, the plurality of first data conversion circuits converting the plurality of analog receiving signals to a plurality of digital receiving signals, and the plurality of data process units perform phase align operations to the plurality of digital receiving signals; and performing an intra-node calibration to estimate internal delays among the plurality of frontend circuits within each of the sub-arrays with the plurality of data process units, the plurality of first data conversion circuits of the main path, the plurality of second data conversion circuits of the calibration path, and the plurality of frontend circuits.

11. The method of claim 10, further comprising:

configuring a first sub-array, a second sub-array, and a third sub-array of the plurality of sub-arrays as successive sub-arrays in the sub-array chain; and wherein the step of deriving the in-phase signals comprising:

the first sub-array deriving first in-phase signals according to antenna signals received by antenna elements coupled to the first sub-array; and the second sub-array deriving second in-phase signals according to antenna signals received by antenna elements coupled to the second sub-array.

12. The method of claim 11, wherein the step of aggregating the in-phase signals along the sub-array chain to generate the beamformed signal comprises:

the first sub-array combining at least the first in-phase signals to generate a first partial aggregation result to the second sub-array;

the second sub-array receiving the first partial aggregation result from the first sub-array, and the second sub-array combining the first partial aggregation result and the second in-phase signals to generate a second partial aggregation result to the third sub-array.

13. The method of claim 11, further comprising:

determining if any sub-array is failed; and when the second sub-array is determined to be failed, bypassing the first partial aggregation result outputted by the first sub-array to the third sub-array without being processed by the second sub-array.

14. The method of claim 10, wherein:

the sub-arrays in the sub-array chain further comprise a second sub-array adjacent to the first sub-array; and the method further comprises, in a receiving calibration mode:

the first sub-array sending a first test signal to a frontend circuit of the first sub-array;

the first sub-array seconding a second test signal to a frontend circuit of the second sub-array; and estimating a receiving delay between the first sub-array and the second sub-array according to signals received by the frontend circuit of the first sub-array and the frontend circuit of the second sub-array.

15. The method of claim 10, wherein:

the sub-arrays in the sub-array chain further comprise a second sub-array adjacent to the first sub-array; and the method further comprises in a transmitting calibration mode:

the first sub-array sending a first test signal to a frontend circuit of the second sub-array;

the second sub-array sending a second test signal to the frontend circuit of the second sub-array; and estimating a transmitting delay between the first sub-array and the second sub-array according to signals received by the frontend circuit of the second sub-array.

16. The method of claim 10, further comprising:

configuring a plurality of switch units to control electrical connections between adjacent sub-arrays so as to form the sub-array chain in the sub-array network.

17. A beamforming antenna device, comprising:

a plurality of antenna elements; and a plurality of sub-arrays, coupled to the plurality of antenna elements, wherein each of the sub-arrays is coupled to its adjacent sub-arrays of the plurality of sub-arrays, and at least a portion of the plurality of sub-arrays form a sub-array chain;

wherein each of the plurality of sub-arrays comprises:

a plurality of frontend circuits, wherein each of the plurality of frontend circuits is configured to receive signals from an antenna element or to transmit signals to the antenna element;

a main path comprising:

a plurality of data conversion circuits, each configured to convert an analog receiving signal to a digital received signal for processing and convert a digital transmitting signal to an analog transmitting signal for transmission; and a switch unit; and a plurality of data process units, each coupled to a corresponding data conversion circuit of the plurality of data conversion circuits through the switch unit, and configured to perform a phase align operation to the digital received signal and generate the digital transmitting signal;

wherein:

the sub-arrays in the sub-array chain comprise a first sub-array, and a second sub-array adjacent to the first sub-array; and in a transmitting calibration mode, the first sub-array is configured to send a first test signal to a frontend circuit of the second sub-array, and the second sub-array is configured to send a second test signal to the frontend circuit of the second sub-array so as to estimate a transmitting delay between the first sub-array and the second sub-array.

18. A method for operating a beamforming antenna device, wherein the beamforming antenna device comprises a plurality of antenna elements and a plurality of sub-arrays coupled to the plurality of antenna elements, the method comprises:

propagating a clock signal originated from a master sub-array of the plurality of sub-array sequentially through the rest of the plurality of sub-arrays in a manner of node-to-node transmission;

receiving a plurality of antenna signals by the plurality of antenna elements;

deriving in-phase signals by utilizing at least a portion of the plurality of sub-arrays in a sub-array chain to perform phase align operations according to antenna signals received by antenna elements that are coupled to the sub-arrays in the sub-array chain, wherein the sub-arrays in the sub-array chain comprises a first sub-array and a second sub-array adjacent to the first sub-array, the first sub array comprises a plurality of frontend circuits, a plurality of data conversion circuits, and a plurality of data process units;

aggregating the in-phase signals along the sub-array chain to generate a beamformed signal;

in a transmitting mode:

a first data process unit of the first sub-array transmitting a digital transmitting signal to a first data conversion circuit of the first sub-array;

the first data conversion circuit converting the digital transmitting signal to an analog transmitting signal; and a first frontend circuit of the first sub-array transmitting the analog transmitting signal to a corresponding antenna element; and in a transmitting calibration mode:

the first sub-array sending a first test signal to a frontend circuit of the second sub-array;

the second sub-array sending a second test signal to the frontend circuit of the second sub-array; and estimating a transmitting delay between the first sub-array and the second sub-array according to signals received by the frontend circuit of the second sub-array.

* * * * *